United States Patent
Ichihashi

(10) Patent No.: US 11,567,289 B2
(45) Date of Patent: Jan. 31, 2023

(54) OPTICAL ELEMENT DRIVE DEVICE

(71) Applicant: TDK TAIWAN CORPORATION, Taoyuan (TW)

(72) Inventor: Shusuke Ichihashi, Tokyo (JP)

(73) Assignee: TDK TAIWAN CORPORATION, Taoyuan (TW)

( * ) Notice: Subject to any disclaimer, the term of this patent is extended or adjusted under 35 U.S.C. 154(b) by 445 days.

(21) Appl. No.: 16/930,855

(22) Filed: Jul. 16, 2020

(65) Prior Publication Data

US 2021/0018717 A1    Jan. 21, 2021

(30) Foreign Application Priority Data

Jul. 19, 2019   (JP) .............................. JP2019-133513

(51) Int. Cl.
| | | |
|---|---|---|
| *G02B 7/08* | (2021.01) | |
| *G02B 7/02* | (2021.01) | |
| *H04M 1/02* | (2006.01) | |
| *G02B 13/00* | (2006.01) | |
| *H04N 5/225* | (2006.01) | |

(52) U.S. Cl.
CPC .............. *G02B 7/08* (2013.01); *G02B 7/023* (2013.01); *G02B 13/001* (2013.01); *H04M 1/0264* (2013.01); *H04N 5/2253* (2013.01); *G03B 2205/0053* (2013.01)

(58) Field of Classification Search
USPC .......................................... 359/822; 396/133
See application file for complete search history.

(56) References Cited

U.S. PATENT DOCUMENTS

| | | | | |
|---|---|---|---|---|
| 8,604,780 | B2 * | 12/2013 | Saruki ................... | G01D 5/145 |
| | | | | 324/207.21 |
| 10,627,255 | B2 * | 4/2020 | Uchida .................. | G01D 5/145 |
| 2007/0047152 | A1 * | 3/2007 | Furukawa ............ | G01R 33/093 |
| | | | | 360/319 |
| 2016/0231528 | A1 | 8/2016 | Wong et al. | |
| 2017/0038601 | A1 | 2/2017 | Fan et al. | |
| 2017/0115463 | A1 | 4/2017 | Osaka et al. | |
| 2018/0046063 | A1 | 2/2018 | Sharma | |
| 2018/0274945 | A1 * | 9/2018 | Uchida ................. | G01D 5/145 |
| 2019/0128698 | A1 * | 5/2019 | Umehara ................ | G02B 7/08 |
| 2019/0128699 | A1 * | 5/2019 | Uchida ................. | G01D 5/145 |
| 2020/0292354 | A1 * | 9/2020 | Umehara ................ | G03B 5/02 |
| 2020/0300669 | A1 * | 9/2020 | Umehara ............... | G01D 5/145 |

FOREIGN PATENT DOCUMENTS

| | | | | |
|---|---|---|---|---|
| CN | 108627944 | A | 10/2018 | |
| CN | 109690377 | A | 4/2019 | |
| JP | 2016-017977 | A | 2/2016 | |
| JP | 2017-037306 | A | 2/2017 | |
| JP | 2019-070843 | A | 5/2019 | |
| JP | 2019-082445 | A | 5/2019 | |
| JP | 6517302 | B1 * | 5/2019 | ............. G01D 5/145 |

* cited by examiner

*Primary Examiner* — Clayton E. LaBalle
*Assistant Examiner* — Warren K Fenwick
(74) *Attorney, Agent, or Firm* — Oliff PLC

(57) ABSTRACT

An optical element drive device includes a movable section and a fixed section. The movable section includes a first magnetic field generator for generating a first magnetic field and is drivable in a motion direction. The fixed section includes a sensor unit. The sensor unit carries out a detection based on the first magnetic field and a bias magnetic field different from the first magnetic field.

27 Claims, 23 Drawing Sheets

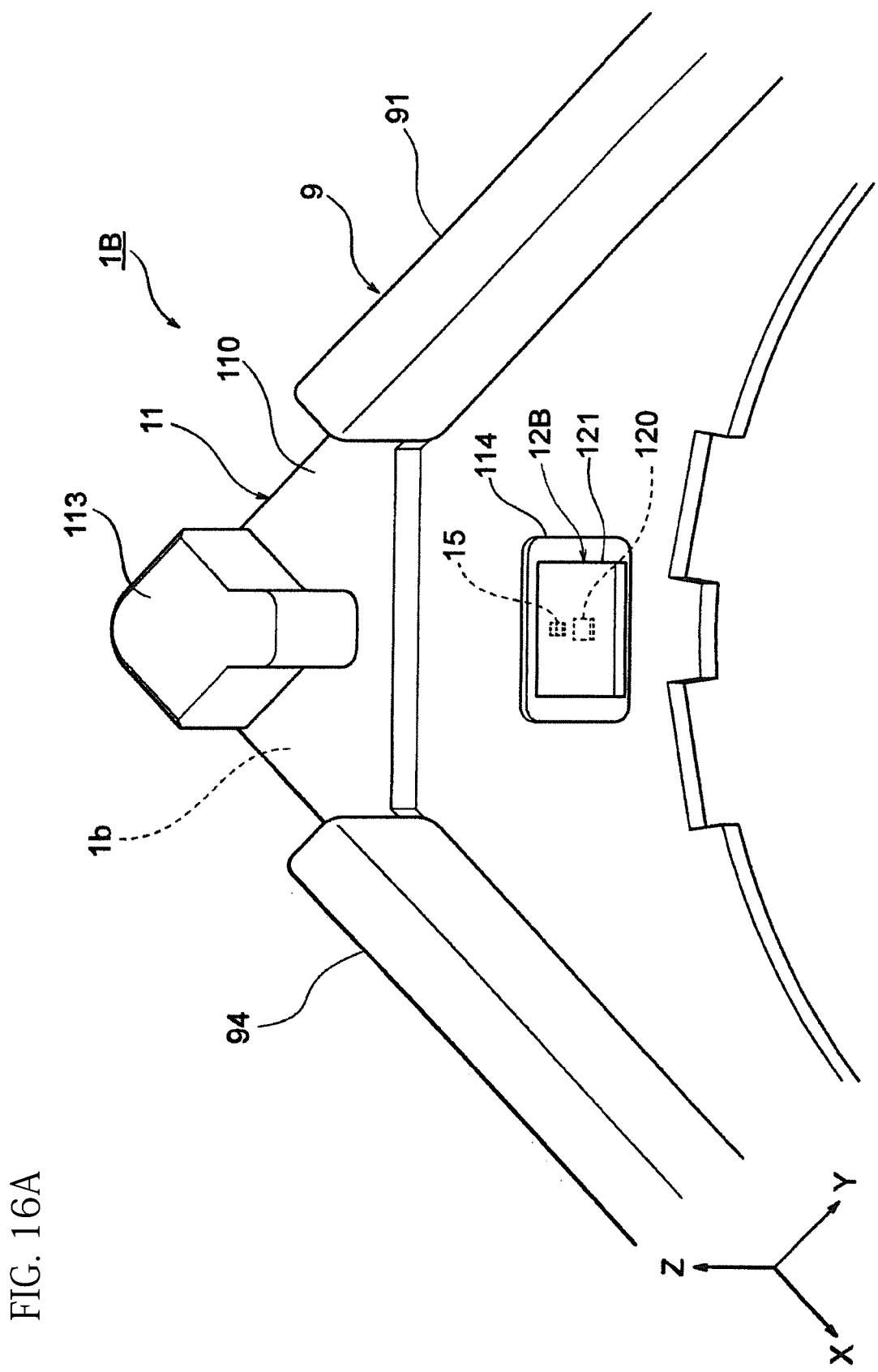

OPTICAL ELEMENT DRIVE DEVICE

BACKGROUND OF THE INVENTION

The present invention relates to an optical element drive device favorably used for, for example, camera module of mobile phones.

As shown in Patent Document 1, conventionally known is an optical element drive device with a position detection part for detecting a position of a lens holder in a motion direction. In the optical element drive device of Patent Document 1, the position detection part is formed from a magnetic detection device disposed on a base member and a sensor magnet disposed on the lens holder. The magnetic detection device detects a position of the sensor magnet, and a relative position of the lens holder to the base member can be detected based on the detection signal.

In the optical element drive device of Patent Document 1, however, the detection accuracy of the position of the sensor magnet by the magnetic detection device may decrease due to change in external environment (e.g., temperature change), and the relative position of the lens holder may not be detected accurately.

Patent Document 1: JP2016017977 (A)

BRIEF SUMMARY OF INVENTION

The present invention has been achieved under such circumstances. It is an object of the invention to provide an optical element drive device capable of accurately detecting a relative position of a movable section to a fixed section regardless of change in external environment.

To achieve the above object, an optical element drive device according to the present invention includes:

a movable section including a first magnetic field generator for generating a first magnetic field and being drivable in a motion direction; and a fixed section including a sensor unit, wherein the sensor unit carries out a detection based on the first magnetic field and a bias magnetic field different from the first magnetic field.

In the optical element drive device according to the present invention, the sensor unit carries out a detection based on the first magnetic field and a bias magnetic field different from the first magnetic field. In this structure, unlike the prior arts, the sensor unit does not carry out a detection based on only the strength of the first magnetic field, but carries out a detection based on interaction (correlation) between the first magnetic field and the bias magnetic field. In that case, both of the first magnetic field and the bias magnetic field change even if the external environment changes, a detected value of the detection signal of the sensor unit can be prevented from including a change of the external environment as an error. Thus, the position of the first magnetic field generator can accurately be detected based on the detection signal of the sensor unit, and the relative position of the movable section to the fixed section can accurately be detected regardless of change in external environment.

Preferably, the sensor unit detects a combined magnetic field of the first magnetic field and the bias magnetic field. In this structure, the change of the combined magnetic field can be determined based on the detection signal of the sensor unit. Based on this change, the position of the first magnetic field generator can be detected, and the relative position of the movable section to the fixed section can be detected.

Although the details are mentioned below, when the movable section moves in the motion direction, the vector of the combined magnetic field of the first magnetic field and the bias magnetic field at a predetermined detection position changes before and after the movement. For example, the distance between the predetermined position and the first magnetic field generator can be obtained by obtaining the amount of change between an angle formed by the vector of the combined magnetic field before the movement relative to the reference direction and an angle formed by the vector of the combined magnetic field after the movement relative to the reference direction at the predetermined distance, and the position of the first magnetic field generator can be detected based on the distance.

Preferably, the fixed section includes a bias magnetic field generator for generating the bias magnetic field, and the bias magnetic field generator is disposed around a sensor included in the sensor unit. In this structure, the bias magnetic field having a sufficient strength can constantly be supplied to the sensor, and even if a unnecessary external magnetic field is applied to the sensor, it is possible to minimize the effect and to sufficiently ensure the reliability of the detected value of the detection signal of the sensor. When the temperature around the sensor unit changes, the temperatures of both of the sensor and the bias magnetic field generator change, and temperature characteristics of the sensor can thereby be favorable.

Preferably, the fixed section includes a second magnetic field generator for generating a second magnetic field, and the second magnetic field is applied to the sensor unit as the bias magnetic field. For example, a drive magnet can be used as the second magnetic field generator. In this case, the drive magnet can be substituted for the bias magnetic field generator. Thus, the second magnetic field generated from the second magnetic field generator can be utilized as the bias magnetic field and applied to the sensor unit without separately preparing and disposing the bias magnetic field generator. Incidentally, the fixed section may be provided with both of the second magnetic field generator and a bias magnetic field generator different therefrom, and both of the second magnetic field and a bias magnetic field may be applied to the sensor unit.

Preferably, the sensor unit carries out a detection based on the first magnetic field and the second magnetic field. In this structure, a detection can be carried out based on interaction (correlation) between the first magnetic field and the second magnetic field. In that case, both of the first magnetic field and the second magnetic field change even if the external environment changes, and a detected value of the detection signal of the sensor unit can thereby be prevented from including a change of the external environment as an error. Thus, based on the detection signal of the sensor unit, the position of the first magnetic field generator can be detected accurately, and the relative position of the movable section to the fixed section can be detected accurately.

Preferably, the sensor unit detects a combined magnetic field of the first magnetic field and the second magnetic field. In this structure, the change of the combined magnetic field can be determined from the detection signal of the sensor unit, and based on the result, it is possible to accurately detect a position of the first magnetic field generator and a relative position of the movable section to the fixed section.

Preferably, the movable section includes a coil to be drivable by interaction of a magnetic field generated by the coil and the second magnetic field. In this structure, a moving-coil type optical element drive device can be constituted. Incidentally, a moving-magnet type optical element drive device may be constituted by providing the movable section with a magnet (drive magnet) instead of the coil.

Preferably, the sensor unit includes a sensor capable of detecting an angle corresponding to a movement displacement of the first magnetic field generator. In general, when a hall sensor is employed as a magnetic detection element, the larger the movement displacement of the first magnetic field generator to a predetermined detection position is, the smaller the change of the detection signal of the sensor unit is, and it may be difficult to ensure the linearity of the detected value of the detection signal. On the other hand, when the sensor is employed as a magnetic detection element, even if the displacement of the first magnetic field generator to a predetermined detection position is large, the change of the detection signal of the sensor unit is hard to be small, and the linearity of the detected value of the detection signal can be ensured sufficiently. In this respect as well, based on the detection signal of the sensor unit, it is thereby possible to accurately detect the position of the first magnetic field generator and the relative position of the movable section to the fixed section.

Even if the strengths of the first magnetic field and the bias magnetic field (or the second magnetic field) change due to change in external environment, the relative angle of their combined magnetic field is constant regardless of change in external environment, and the relative position of the movable section to the fixed section can be detected accurately regardless of change in external environment.

Preferably, the second magnetic field generator includes a plurality of second magnetic field generators, and the sensor unit is disposed within a region defined by the second magnetic field generators. In this region, unnecessary magnetic fields from outside are blocked by the multiple second magnetic field generators, and the detection of the sensor unit can be carried out with high detection accuracy while the influence of external magnetic fields is reduced.

Preferably, the sensor unit is disposed closer to a center of the fixed section than to the coil when viewed from the motion direction of the movable section. In this structure, the sensor unit is disposed away from the coil, and the magnetic field generated by the coil can be prevented from being detected incorrectly by the sensor unit. In addition, the sensor unit is disposed relatively radially inside the fixed section, and the device can thereby be downsized overall.

Preferably, the movable section includes a balance member disposed on the other side of the first magnetic field generator across an optical element. In this structure, one side of the movable section on which the first magnetic field generator is disposed and the other side of the movable section on which the balance member is disposed are balanced, and it is possible to prevent the movement of the movable section in the motion direction from being hindered.

Preferably, stoppers for regulating a movement of the movable section in the motion direction are arranged away from each other in the fixed section, and the sensor unit is disposed within a region sandwiched by ends of the stoppers next to each other when viewed from the motion direction of the movable section. In that case, the sensor unit is disposed away from the stoppers, and the stoppers can thereby regulate the movement of the movable section in the motion direction without being hindered by the sensor unit. When the sensor unit is disposed within the above-mentioned region, the position of the first magnetic field generator can be detected further accurately by the sensor unit.

Preferably, the sensor unit is disposed so as not to overlap with a back spring for supporting the movable section from behind when viewed from the motion direction of the movable section. In this structure, when the back spring bends in the motion direction in accordance with the movement of the movable section in the motion direction, the back spring can be prevented from contacting with the sensor unit, and the movement of the movable section in the motion direction can be prevented from being hindered.

Preferably, the sensor unit is disposed so that a front end of the sensor unit is located forward from a front end of a stopper for regulating a movement of the movable section in the motion direction and is located backward from a back end of a back spring for supporting the movable section from behind. In this case as well, as mentioned above, the back spring can be prevented from contacting with the sensor unit, and the movement of the movable section in the motion direction can be prevented from being hindered.

Preferably, the sensor unit faces the first magnetic field generator via a fixation member for fixing the sensor unit to the fixed section. When the sensor unit is disposed at a position facing the first magnetic field generator, the first magnetic field generated by the first magnetic field generator can be detected with high detection accuracy by the sensor unit. When the sensor unit is fixed to the fixed section using the fixation member so that at least a part of the fixation member is disposed between the sensor unit and the first magnetic field generator, the position of the sensor unit can be prevented from shifting. The sensor unit is not fixed to the fixed section via a flexible printed circuit (FPC) substrate, but is directly fixed to the fixed section. This makes it possible to achieve the low profile of the optical element drive device and the low pricing of the optical element drive device as no FPC substrate is used.

Preferably, the fixed section includes a yoke disposed to surround the movable section, the yoke is provided with a pair of protrusion pieces protruding toward an inner side of the yoke, and either of the protrusion pieces is located at an end of the yoke located on one side of the sensor unit, and the other protrusion piece is located at an end of the yoke located on the other side of the sensor unit, when viewed from a direction perpendicular to the motion direction of the movable section. In this structure, when the protrusion pieces are fixed to the movable section, the protrusion pieces can regulate the movement of the movable section in the rotation direction and prevent the position of the movable section from shifting in the rotation direction. When the movable section collides with the yoke, the impacts can be dispersed via the protrusion pieces.

Preferably, the first magnetic field generator is embedded into the movable section. In this structure, the first magnetic field generator can be fixed to the movable section without being exposed outside and can effectively be protected from, for example, impacts from outside.

BRIEF DESCRIPTION OF DRAWINGS

FIG. 10A is a top view for explaining a position relation among, the front spring, the base member, a sensor unit, and the like;

FIG. 10B is a top view for explaining a position relation among a driving coil, a drive magnet, a back spring, a sensor magnet, the base member, the sensor unit, and the like;

FIG. 12 is a schematic view for explaining a position relation among the drive coil, the sensor coil, the drive magnet, the sensor unit, and the like;

FIG. 16A is a partial schematic view of an optical element drive device according to Third Embodiment of the present invention;

DETAILED DESCRIPTION OF INVENTION

Hereinafter, the present invention is explained based on embodiments shown in the figures.

First Embodiment

Figure 1:
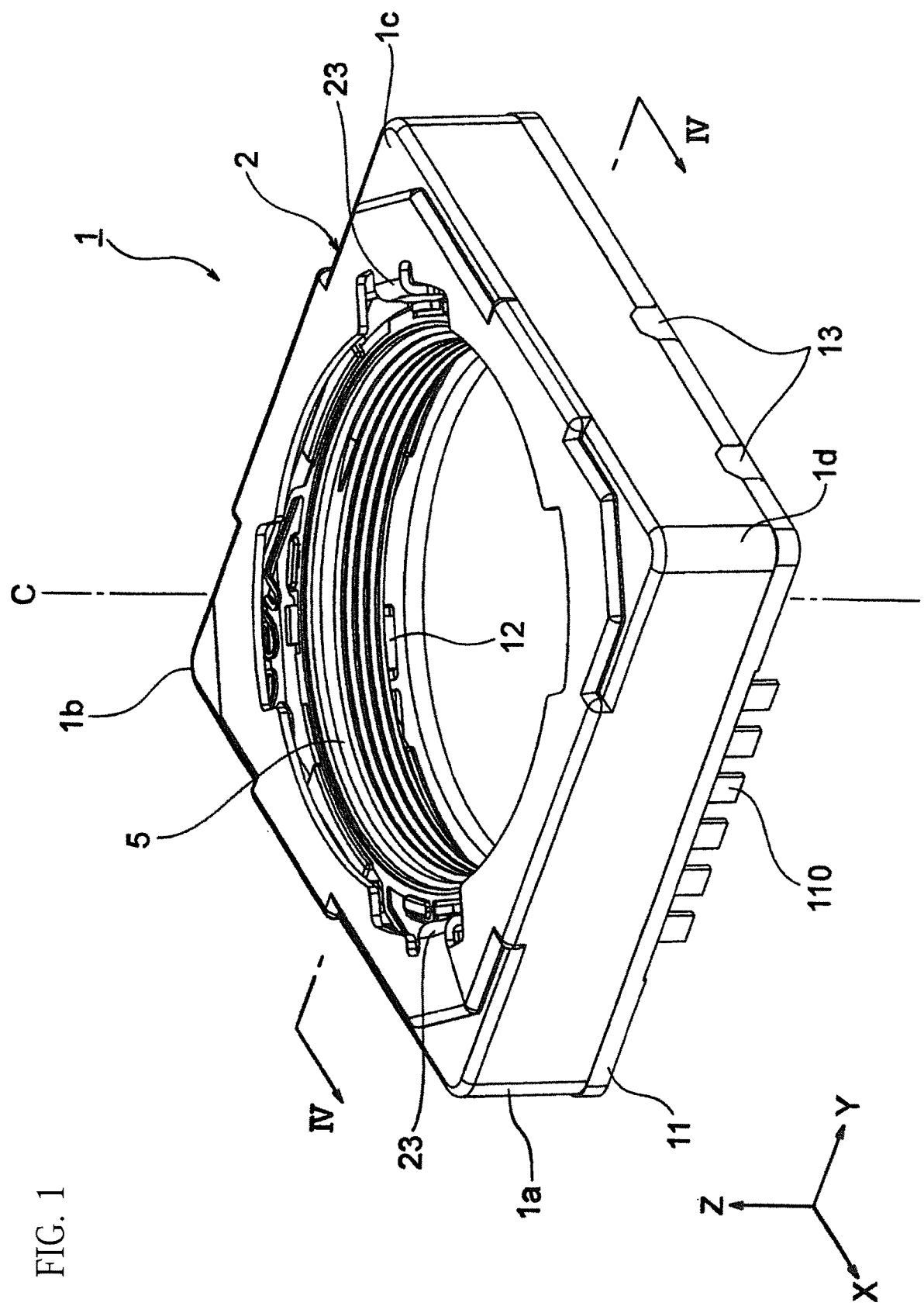
FIG. 1 is a general perspective view of an optical element drive device according to First Embodiment of the present invention.

As shown in FIG. 1, an optical element drive device 1 according to First Embodiment of the present invention is for driving, for example, a lens holder 5 for holding an optical element (e.g., lens) not illustrated in a motion direction. The motion direction of the lens holder corresponds to the Z-axis direction and equals to the optical axis of the lens (not illustrated). Hereinafter, the upper side (positive side) of the Z-axis direction is the front side, and the lower side (negative side) of the Z-axis direction is the back side. The front of the optical element drive device 1 corresponds to an object side with respect to the lens, and the back of the optical element drive device 1 corresponds to an image sensor side with respect to the lens. Incidentally, the lens may be formed from one lens or multiple lenses.

The axis C shown in the figures is a motion axis (driving axis) of a movable section (lens holder 5 etc.) and extends in a direction parallel to the Z-axis. The optical element drive device 1 has a substantially rectangular outer circumferential shape viewed from the motion direction of the lens holder 5 (the direction along the motion axis C). The lens (not illustrated) can be held by an opening (through hole) formed in the central part of the optical element drive device 1.

The optical element drive device 1 is used by being combined with an image sensor not illustrated (e.g., solid-state image sensor). The image sensor is disposed in the back of the lens holder 5 and generates an image by photoelectrically converting the light emitted from the lens (not illustrated) held by the lens holder 5. The image sensor is disposed in any manner and may directly be fixed to the base member 11 or may be connected to the optical element drive device 1 via another member.

The optical element drive device 1 is built in various electronic devices and is, for example, built in a mobile terminal, such as a smart phone with a camera capable of auto-focusing (AF), a mobile phone, a laptop computer, a tablet computer, a portable game machine, a web camera, and a vehicle-mounted camera.

Figure 3:
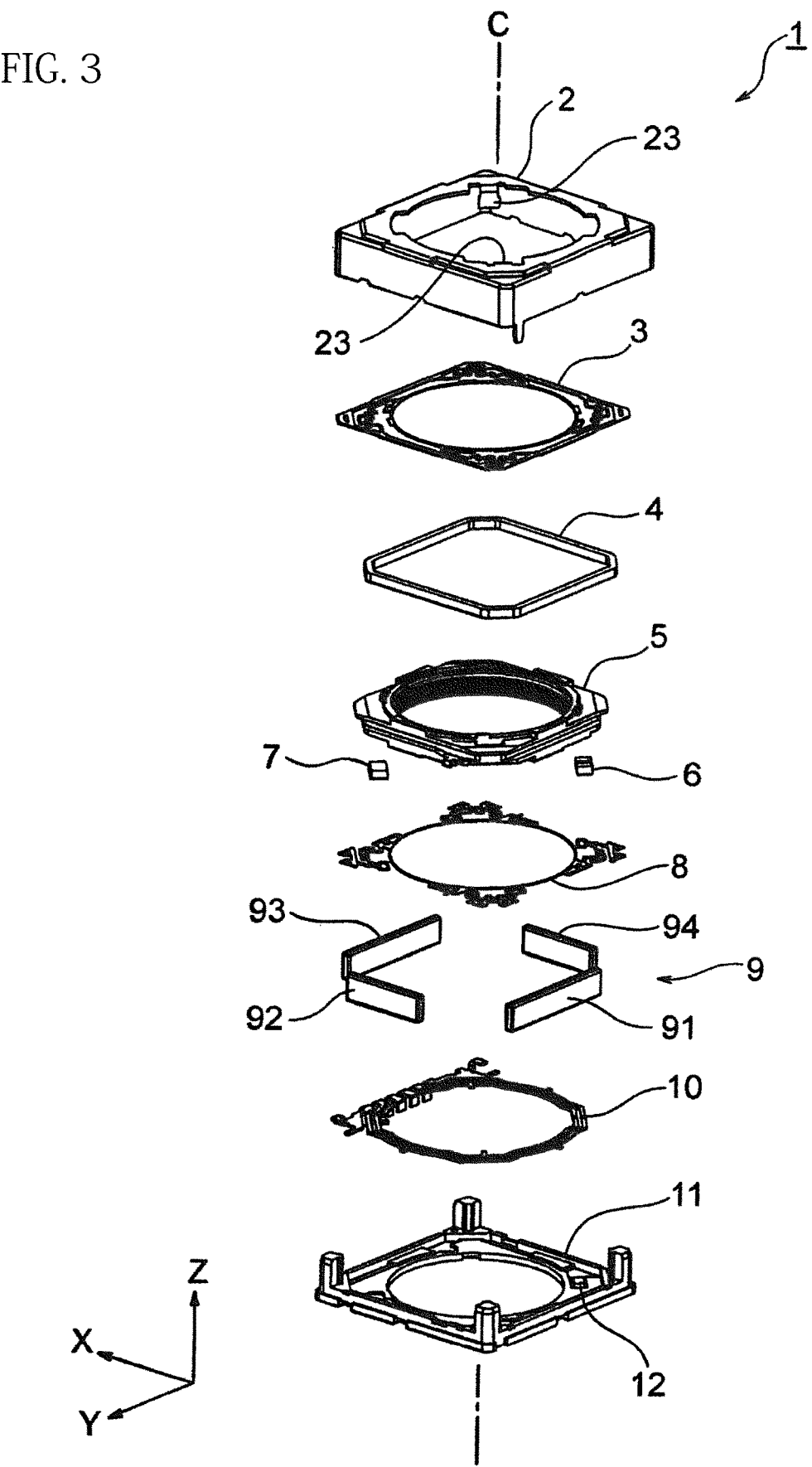
FIG. 3 is an exploded perspective view of the optical element drive shown in FIG. 1.

As shown in FIG. 3, the optical element drive device 1 includes a yoke 2, a front spring 3, a drive coil 4, a lens holder 5, a sensor magnet 6, a balance magnet 7, a back spring 8, a drive magnet 9, a circuit unit 10, a base member 11, and a sensor unit 12. The optical element drive device 1 is roughly divided into a movable section and a fixed section. The movable section is configured to be drivable along the motion axis C in the motion direction while being positioned radially (in a radial direction of the opening shown in FIG. 1) to the fixed section. Among the above-mentioned components 2-12, the front spring 3, the drive coil 4, the lens holder 5, the sensor magnet 6, the balance magnet 7, and the back spring 8 are arranged in the movable section, and the yoke 2, the drive magnet 9, the circuit unit 10, the base member 11, and the sensor unit 12 are arranged in the fixed section.

Figure 5:
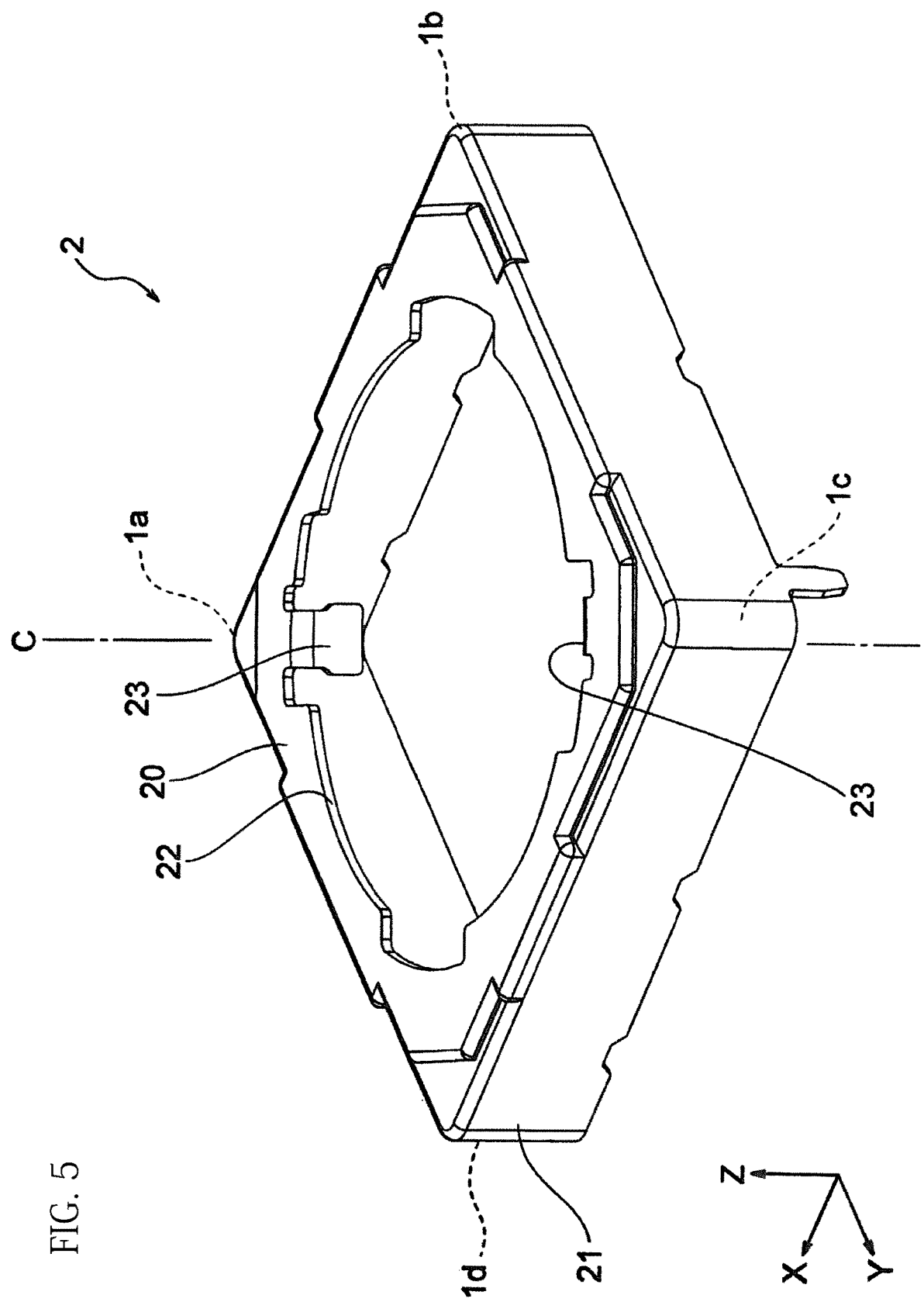
FIG. 5 is a perspective view of the yoke shown in FIG. 3.

As shown in FIG. 5, the yoke 2 has a substantially square cylindrical outer shape and is disposed to surround the movable section (e.g., lens holder 5) from the front. The yoke 2 includes a yoke front edge 20, an outer cylinder 21, a yoke opening 22, and protrusion pieces 23. The yoke front edge 20 is located on the front side of the yoke 2 and has a plate surface parallel to the X-Y plane. When the yoke 2 is attached to the optical element drive device 1 (see FIG. 1), the yoke front edge 20 is disposed to cover the front of the lens holder 5.

The yoke opening 22 is formed in a central part of the yoke front edge 20. The protrusion pieces 23 are formed around an opening periphery of the yoke opening 22. The protrusion pieces 23 protrude toward the inner side of the yoke 2 (the negative side of the Z-axis direction). In the present embodiment, a pair of yoke pieces 23 is formed around the opening periphery of the yoke opening 22.

Either of the protrusion pieces 23 is disposed at a position corresponding to a corner 1a among four corners 1a-1d of the optical element drive device 1 shown in FIG. 1. The other protrusion piece 23 is disposed at a position corresponding to the corner 1c among the corners 1a-1d. That is, as shown in FIG. 5, the other protrusion piece 23 is disposed on the other side of either of the protrusion pieces 23 to the yoke opening 22 or disposed at a position facing either of the protrusion pieces 23. The protrusion pieces 23 are arranged on a diagonal line (a diagonal line connecting the corner 1*a* and the corner 1*c*) of the yoke front edge 20.

As shown in FIG. 1, among the corners 1*a*-1*d*, the sensor unit 12 is disposed on the base member 11 at the corner 1*b* next to two corners 1*a* and 1*c* with the protrusion pieces 23. That is, each of the two protrusion pieces 23 is not disposed at a position overlapping with the sensor unit 12 when viewed from the motion direction of the lens holder 5. In other words, when viewed from a direction perpendicular to the motion direction of the lens holder 5 (a direction parallel to the X-Y plane), either of the protrusion pieces 23 is located at the end of the yoke 2 located on one side of the sensor unit 12 (left side of the page), and the other protrusion piece 23 is located at the end of the yoke 2 located on the other side of the sensor unit 12 (right side of the page).

As shown in FIG. 5, the protrusion pieces 23 have a hook shape and extend backward. For more detail, the protrusion pieces 23 protrude radially toward the inner side of the yoke opening 22 by a predetermined length and also protrude backward by a predetermined length. As shown in FIG. 1, the protrusion pieces 23 are inserted into protrusion-piece insertion grooves 53 formed at the front end of the lens holder 5 mentioned below (see FIG. 6A). That is, either of the pair of protrusion pieces 23 is fixed to the end of the lens holder 5 located on one side of the sensor unit 12 (left side of the page in FIG. 1), and the other protrusion piece 23 is fixed to the end of the lens holder 5 located on the other side of the sensor unit 12 (right side of the page in FIG. 1). When the protrusion pieces 23 are inserted into the protrusion-piece insertion grooves 53, the lens holder 5 can be prevented from rotating around the motion axis C (rotation axis) in the rotation direction.

As shown in FIG. 5, the outer cylinder 21 has a substantially square cylindrical outer shape. The outer cylinder 21 is formed around the outer periphery of the yoke front edge 20 and extends backward from the yoke front edge 20 along the motion axis C. As shown in FIG. 1, when the yoke 2 is disposed in the optical element drive device 1, the outer cylinder 21 is disposed to cover the lateral part of the base member 11. This allows the yoke front edge 20 and the outer cylinder 21 to surround (protect) the movable section. The back end (open end) of the outer cylinder 21 and the base member 11 (base bottom 110 mentioned below) are bonded (fixed) via a resin 13. Incidentally, the fixed position of the outer cylinder 21 and the base member 11 is not limited to the illustrated position and may be changed appropriately.

Figure 4:
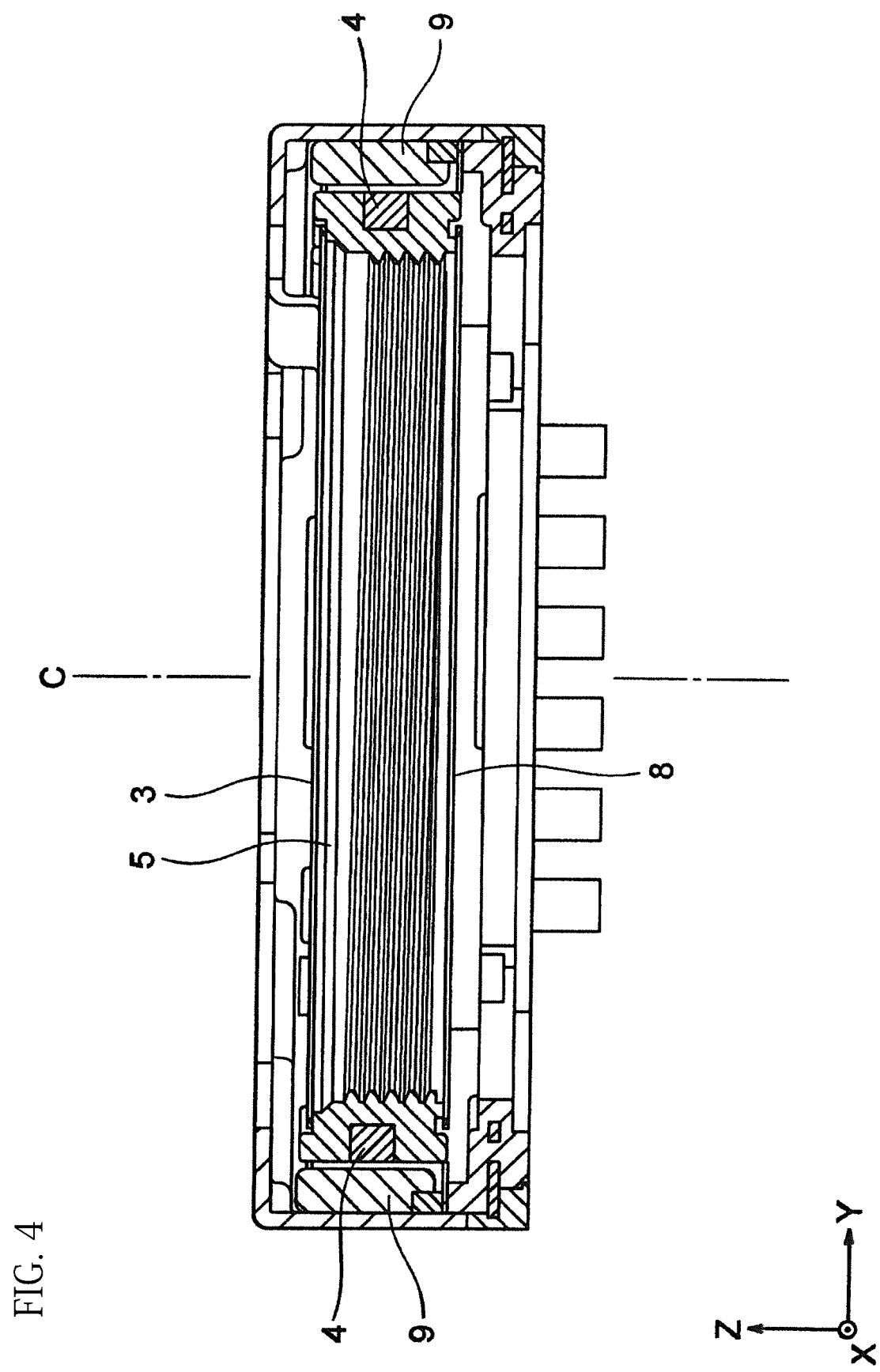
FIG. 4 is a cross-sectional view of the optical element drive shown in FIG. 1 taken along the IV-IV line.
Figure 6A:
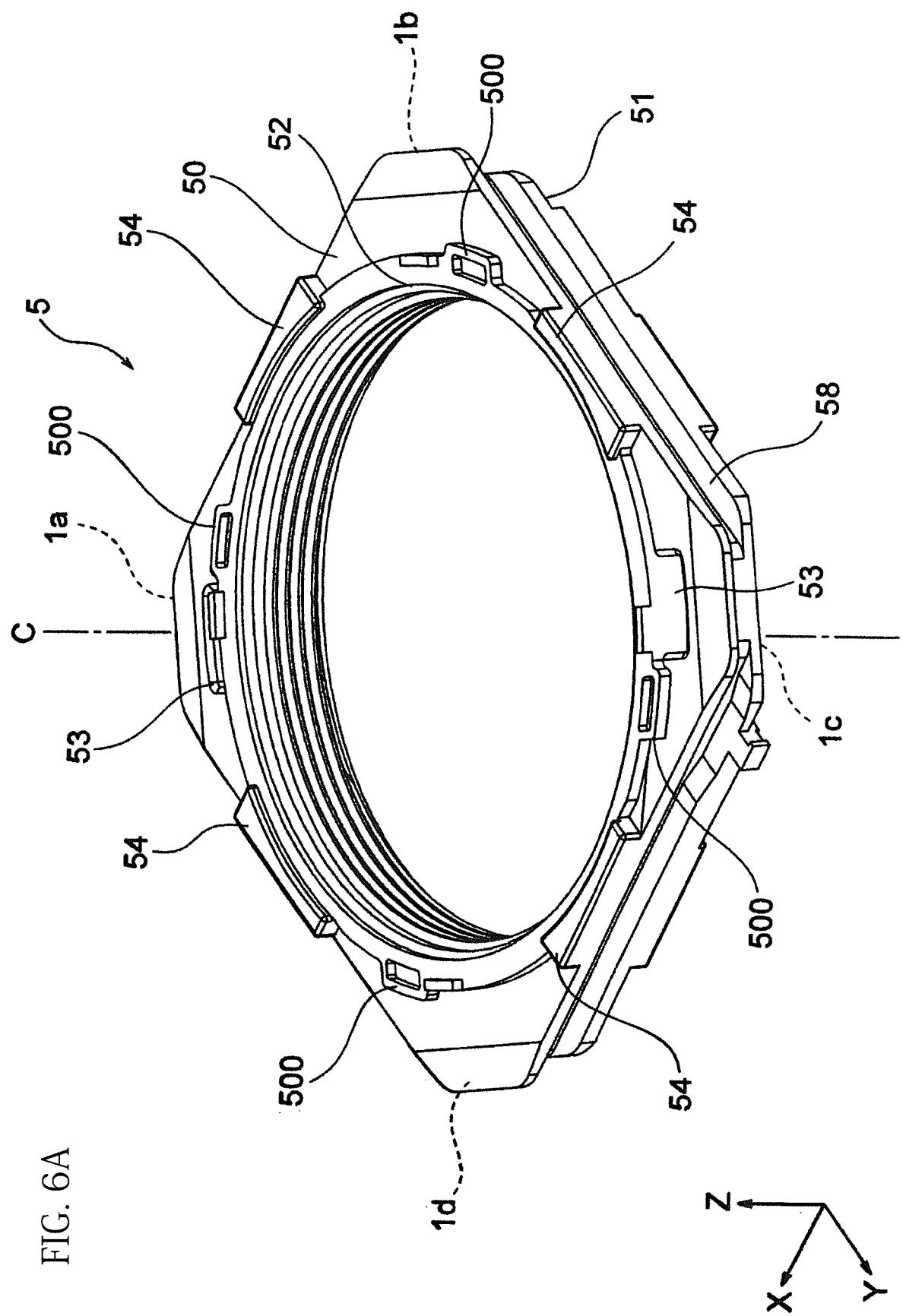
FIG. 6A is a perspective view of the lens holder shown in FIG. 3 viewed from above.
Figure 6B:
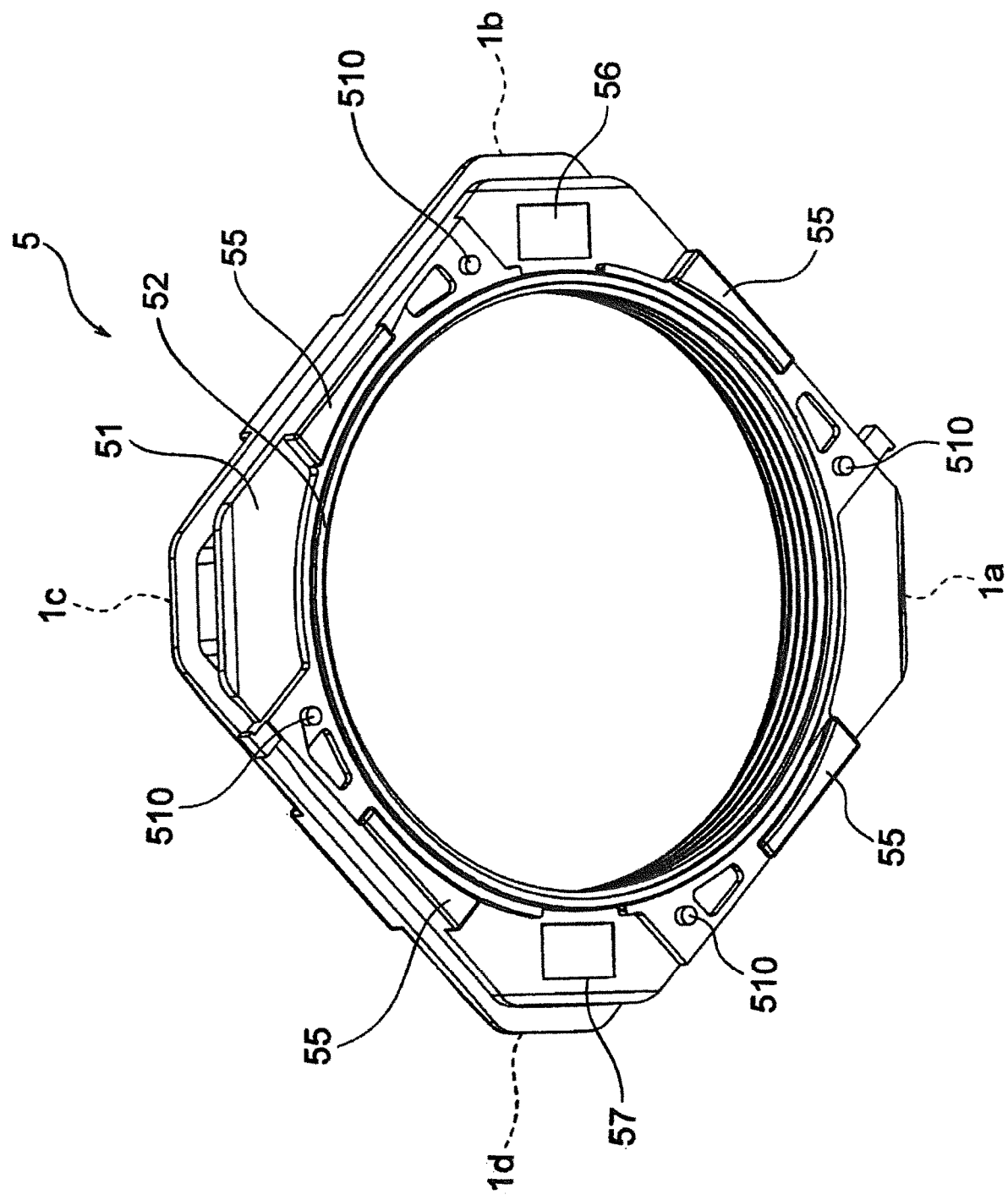
FIG. 6B is a perspective view of the lens holder shown in FIG. 3 viewed from below.

As shown in FIG. 6A and FIG. 6B, the lens holder 5 has a substantially hollow cylinder shape. When viewed from the motion direction of the lens holder 5, the lens holder 5 is a substantially rectangular outer shape. The lens holder 5 is a member for holding the lens (not illustrated) and includes a holder front end 50, a holder back end 51, a cylinder 52, protrusion-piece insertion grooves 53, front holder stoppers 54, back holder stoppers 55, a sensor-magnet insertion groove 56, a balance-magnet insertion groove 57, and a coil insertion groove 58. As shown in FIG. 4, the front of the lens holder 5 is connected to the front spring 3, and the back of the lens holder 5 is connected to the back spring 8.

As shown in FIG. 6A and FIG. 6B, the holder front end 50 is in front (front end) of the lens holder 5, and the holder back end 51 is in back (back end) of the lens holder 5. When viewed from the motion direction of the lens holder 5, each of the holder front end 50 and the holder back end 51 has a substantially rectangular outer circumferential shape. Spring fixation portions 500 are formed along the opening of the cylinder 52 at regular intervals at multiple points (four points in the illustrated example) of the holder front end 50. The spring fixation portions 500 can be engaged with holder fixation potions 34 of the front spring 3 mentioned below. This makes it possible to fix the front spring 3 to the lens holder 5.

Spring fixation convexes 510 are formed along the opening of the cylinder 52 at regular intervals at multiple points (four points in the illustrated example) of the holder back end 51. Holder fixation portions 81 of the back spring 8 mentioned below can be engaged with the spring fixation convexes 510. This makes it possible to fix the back spring 8 to the lens holder 5.

The cylinder 52 has a through hole (opening) extending along the motion axis C. The lens (not illustrated) is attached to the inner circumferential surface of the through hole.

As mentioned above, the protrusion-piece insertion grooves 53 are grooves for inserting the protrusion pieces 23 (see FIG. 5) and are formed at the holder front end 50. In the illustrated example, two protrusion-piece insertion grooves 53 are formed at the holder front end 50. Each of the two protrusion-piece insertion grooves 53 is formed at a position of the holder front end 50 corresponding to each of two protrusion pieces 23 (a position corresponding to the corners 1*a* and 1*c* shown in FIG. 1).

The front holder stoppers 54 are formed along the outer periphery of the holder front end 50. For more detail, the front holder stoppers 54 are formed between the outer circumference of the holder front end 50 and the opening periphery of the cylinder 52. In the illustrated example, four front holder stoppers 54 are formed at the holder front end 50, and each of the four front holder stoppers 54 is disposed at each of four sides forming the outer circumferential shape (rectangle) of the holder front end 50. The front holder stoppers 54 are arranged away from each other at substantially regular intervals along the opening periphery of the cylinder 52 so as to surround the opening.

Each of the front holder stoppers 54 has a predetermined length along each side of the holder front end 50 and a predetermined height (thickness) along the motion axis C and protrudes forward from the front end of the cylinder 52. The front holder stoppers 54 are arranged to restrict the movement of the lens holder 5 in the motion direction. The front holder stoppers 54 can restrict the forward movement of the lens holder 5 by contacting with the yoke front end 20 of the yoke 2 (see FIG. 5) from the inner side.

The back holder stoppers 55 are formed along the outer periphery of the holder back end 51. For more detail, the back holder stoppers 55 are formed between the outer circumference of the holder back end 51 and the opening periphery of the cylinder 52. In the illustrated example, four back holder stopper 55 are formed at the holder back end 51, and each of the four back holder stoppers 55 is disposed at each of four sides forming the outer circumferential shape (rectangle) of the holder back end 51. The back holder stoppers 55 are arranged away from each other at substantially regular intervals along the opening periphery of the cylinder 52 so as to surround the opening.

Each of the back holder stoppers 55 has a predetermined length along each side of the holder back end 51 and a predetermined height (thickness) along the motion axis C and protrudes backward from the back end of the cylinder 52. The back holder stoppers 55 are arranged to restrict the movement of the lens holder 5 in the motion direction. The back holder stoppers 55 can restrict the backward movement of the lens holder 5 by contacting with base stoppers 112 formed on the base member 11 mentioned below (see FIG. 7).

The sensor-magnet insertion groove 56 is a groove formed for containing the sensor magnet 6. The balance-magnet insertion groove 57 is a groove formed for containing the balance magnet 7. Among the four corners 1a-1d of the optical element drive device 1 (see FIG. 1), the sensor-magnet insertion groove 56 is disposed at a position corresponding to the corner 1b, and the balance-magnet insertion groove 57 is disposed at a position corresponding to the corner 1d. That is, the balance-magnet insertion groove 57 is disposed on the other side of the sensor-magnet insertion groove 56 across the opening of the cylinder 52 or disposed at a position facing the sensor-magnet insertion groove 56. The sensor-magnet insertion groove 56 and the balance-magnet insertion groove 57 are arranged on a diagonal line of the holder back end 51 (the diagonal line connecting the corner 1b and the corner 1d).

The coil insertion groove 58 is formed on the outer circumferential surface of the lens holder 5 so as to surround the outer circumference of the lens holder 5. The drive coil 4 shown in FIG. 3 is inserted into the coil insertion groove 58 and can be fixed to the lens holder 5.

Figure 7:
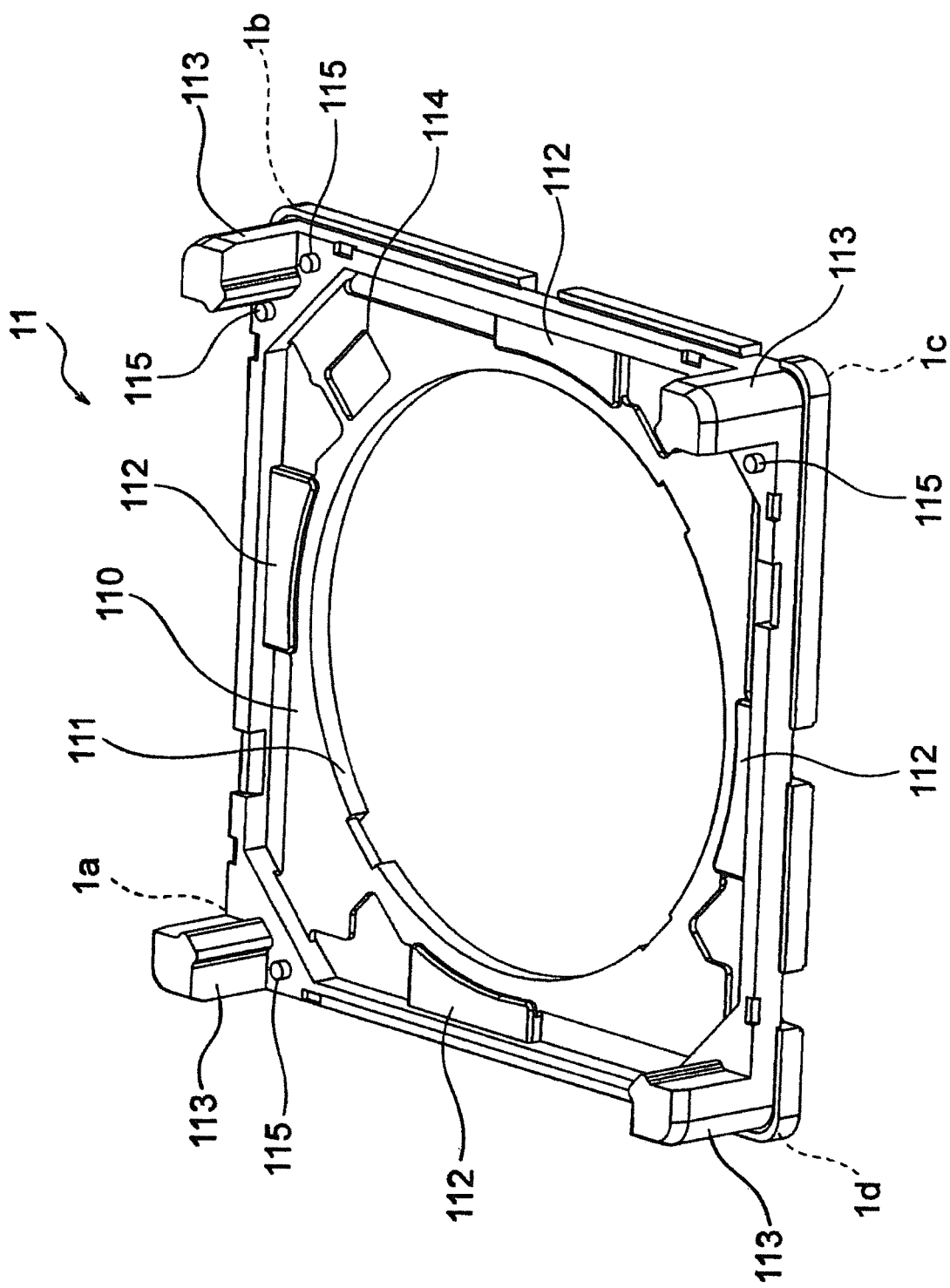
FIG. 7 is a perspective view of the base member shown in FIG. 3.

As shown in FIG. 7, the base member 11 includes a base bottom 110, a base opening 111, base stoppers 112, columns 113, a sensor housing concave 114, and spring fixation convexes 115. The base bottom 110 is made of a flat plate having a plate surface parallel to the X-Y plane and has a substantially rectangular outer circumferential shape when viewed from the motion direction of the lens holder 5.

When the base member 11 is attached to the optical element drive device 1 (FIG. 1), the base bottom 110 constitutes the back end of the optical element drive device 1 (fixed section). The spring fixation convexes 115 are formed at the four corners of the base bottom 110. Base fixation portions 82 of the back spring 8 mentioned below (see FIG. 9) can be engaged with the spring fixation convexes 115. This makes it possible to fix the back spring 8 to the base member 11.

The base opening 111 is formed in the central part of the base member 110. A part of the lens (not illustrated) is inserted into the base opening 111 to be movable in the motion direction. The base opening 111 is disposed to substantially correspond to the opening of the cylinder 52 of the lens holder 5 (see FIG. 6B) when viewed from the Z-axis direction.

The base stoppers 112 are formed along the outer periphery of the base bottom 110. For more detail, the base stoppers 112 are formed between the outer circumference of the base bottom 110 and the opening periphery of the base opening 111. In the illustrated example, four base stoppers 112 are formed on the base bottom 110, and each of the four base stoppers 112 is disposed at each of four sides forming the outer circumferential shape (rectangle) of the base bottom 110. The base stoppers 112 are arranged away from each other at substantially regular intervals along the opening periphery of the base opening 111 so as to surround the base opening 111.

Each of the base stoppers 112 has a predetermined length along each side of the base bottom 110 and a predetermined height (thickness) along the motion direction of the lens holder 5 and protrudes forward. The base stoppers 112 are arranged to restrict the movement of the lens holder 5 in the motion direction. The back holder stoppers 55 can restrict the backward movement of the lens holder 5 by contacting with the back holder stoppers 55 of the lens holder 5 (see FIG. 6B).

The columns 113 are formed at the corners of the base bottom 110. In the illustrated example, four columns 113 are formed on the base bottom 110, and the four columns 113 are arranged at the four corners of the base bottom 110. The columns 113 have a substantially column outer shape and protrude forward from the base bottom 110 along the motion direction of the lens holder 5.

The sensor housing concave 114 are dented backward. The sensor unit 12 shown in FIG. 3 can be contained in the sensor housing concave 114. In the illustrated example, the sensor housing concave 114 has a substantially rectangular outer shape when viewed from the motion direction of the lens holder 5, but may have any other polygonal shape or so. Among the corners 1a-1d of the optical element drive device 1 (see FIG. 1), the sensor housing concave 114 is formed at a position corresponding to the corner 1b. The sensor housing concave 114 is formed separately radially outward from the base opening 111 and is located between the opening periphery of the base opening 111 and the columns 113.

The sensor housing concave 114 is located between either of the base stoppers 112 near the corner 1b and the other base stopper 112 along the circumference direction of the base opening 111. The sensor housing concave 114 is located on a diagonal line connecting the corner 1b and the corner 1d.

The depth of the sensor housing concave 114 is determined so that the front end of the sensor unit 12 is exposed to the outside of the sensor housing concave 114 when the sensor unit 12 is disposed in the sensor housing concave 114.

Although not illustrated in detail, the sensor housing concave 114 is filled with a fixation member (e.g., adhesive), and the sensor unit 12 can be fixed in the sensor housing concave 114 by the fixation member. Incidentally, the lateral wall of the sensor housing concave 114 may be uneven so that the fixation member is strongly fixed on the lateral wall of the sensor housing concave 114.

Figure 8:
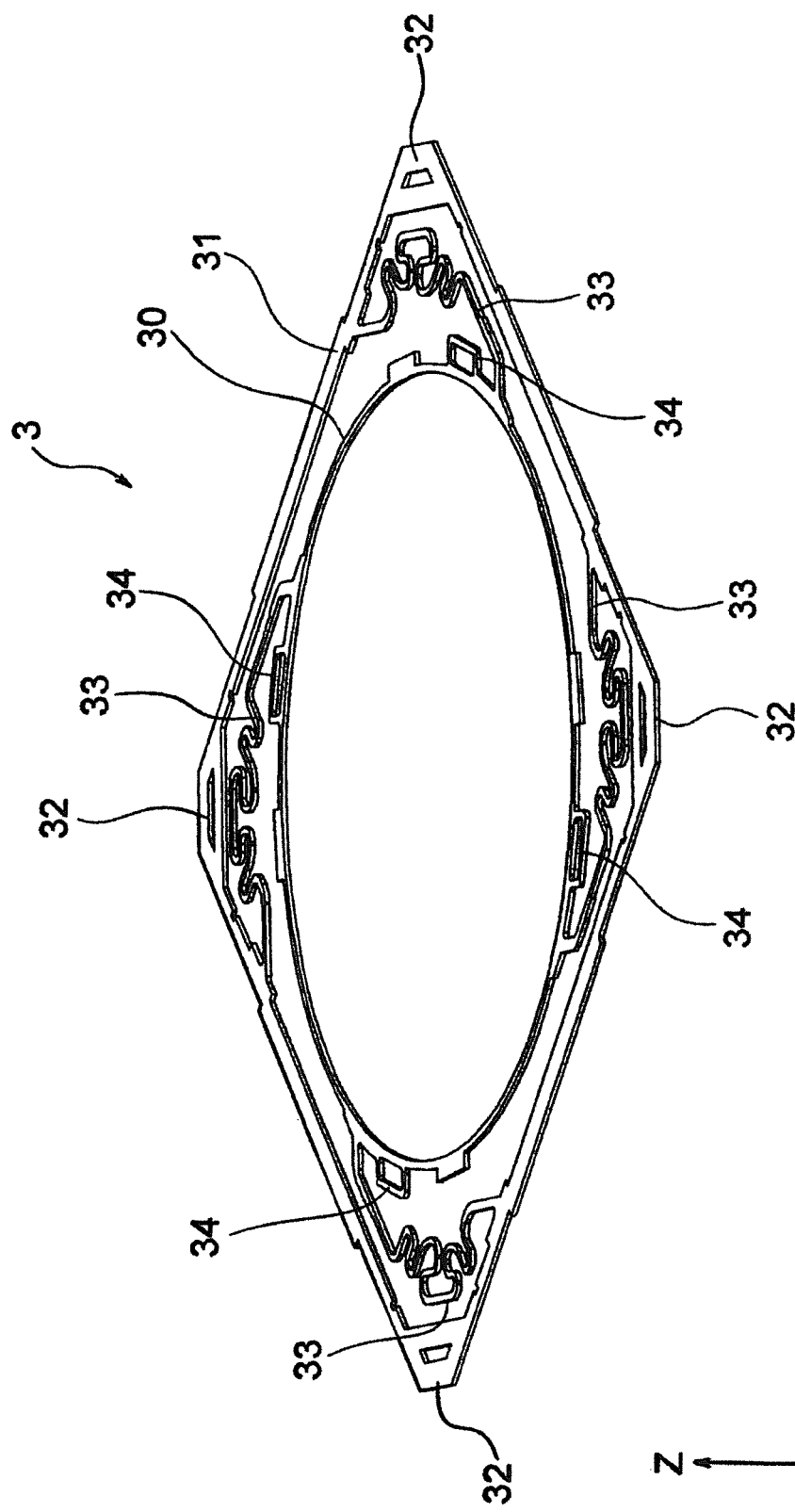
FIG. 8 is a perspective view of the front spring shown in FIG. 3.

As shown in FIG. 8, the front spring 3 is made of a plate spring (leaf spring) composed of a conductive material (e.g., metal) and supports the front of the lens holder 5 (holder front end 50). The front spring 3 includes an inner ring 30, an outer ring 31, base fixation portions 32, arms 33, and holder fixation portions 34.

Figure 2:
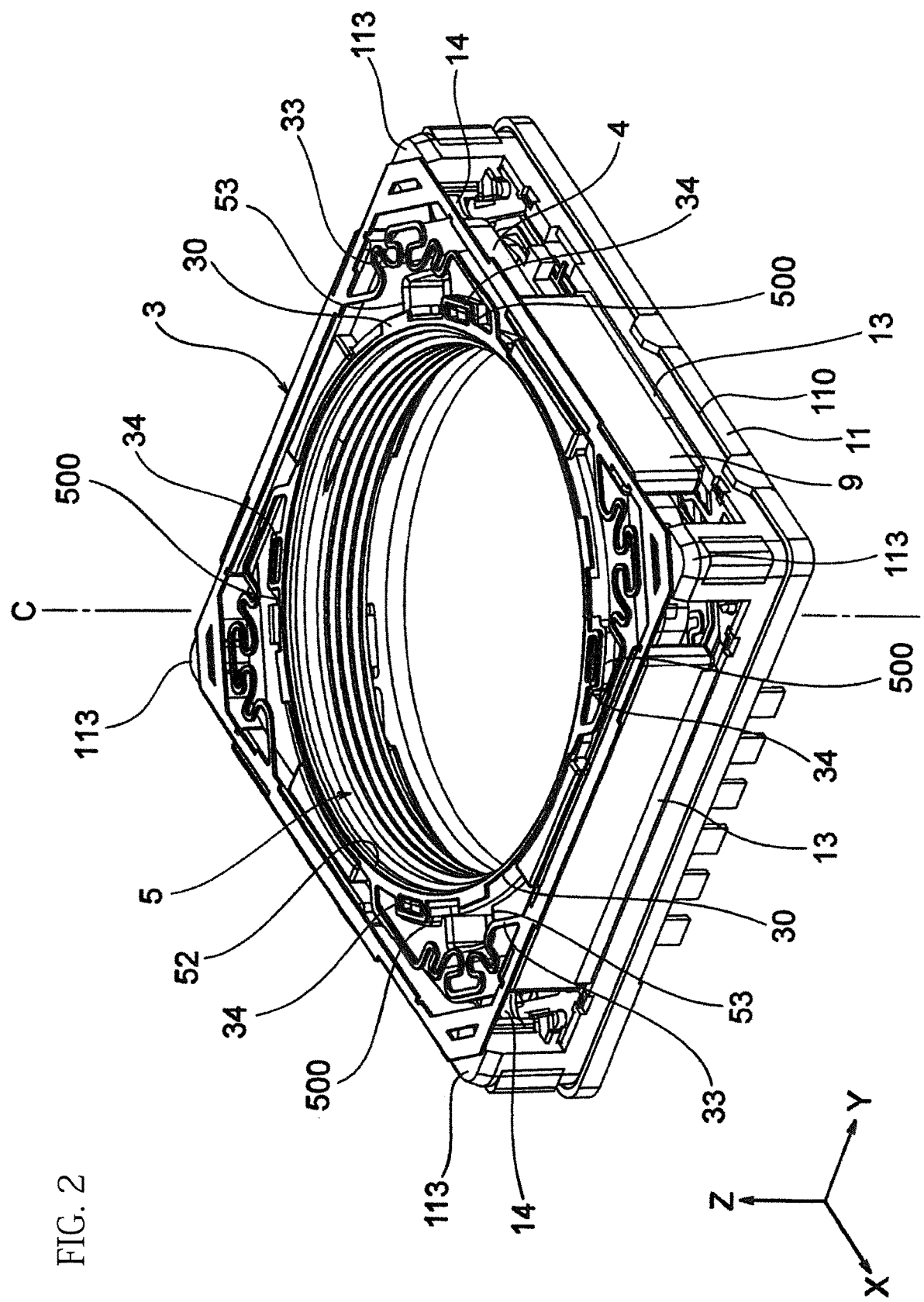
FIG. 2 is a perspective view of the optical element drive shown in FIG. 1 excluding a yoke.

The inner ring 30 has a circular ring outer shape and is disposed along the opening periphery of the cylinder 52 of the lens holder 5 (see FIG. 6A). The holder fixation portions 34 are formed at multiple points (four points in the illustrated example) along the circumference direction of the inner ring 30. As shown in FIG. 2, the holder fixation portions 34 are fixed to the spring fixation portions 500 formed along the opening periphery of the cylinder 52 of the lens holder 5 via the fixation member not illustrated (e.g., adhesive). Incidentally, the means for fixing the inner ring 30 is not limited to the fixation member, but may be engagement or so.

As shown in FIG. 8, the outer ring 31 is located radially outward from the inner ring 30 and has a substantially rectangular ring outer shape. The outer ring 31 has a similar shape of the outer periphery of the base member 11 (see FIG. 7) and is disposed along the outer circumference of the base member 11.

The base fixation portions 32 are formed at the four corners of the outer ring 31, and each of the four base fixation portions 32 is fixed on the front surface of each of the four columns 113 of the base member 11 (see FIG. 7).

The arms 33 have a meandering shape and are arranged at the corners of the front spring 3 by corresponding to the four base fixation portions 32. The four arms 33 connect the inner ring 30 and the outer ring 31. The arms 33 bend at multiple points located between the inner ring 30 and the outer ring 31 and extend away from the inner ring 30 toward the outer ring 31. Spaces are formed between the arms 33 and the inner ring 30. As shown in FIG. 2, the protrusion-piece insertion grooves 53 are arranged in the back of the spaces and are arranged inside the spaces.

When the arms 33 are deformed elastically, the front spring 3 can hold the lens holder 5 connected to the inner ring 30 relatively movably to the base member 11 or so in the motion direction.

Figure 9:
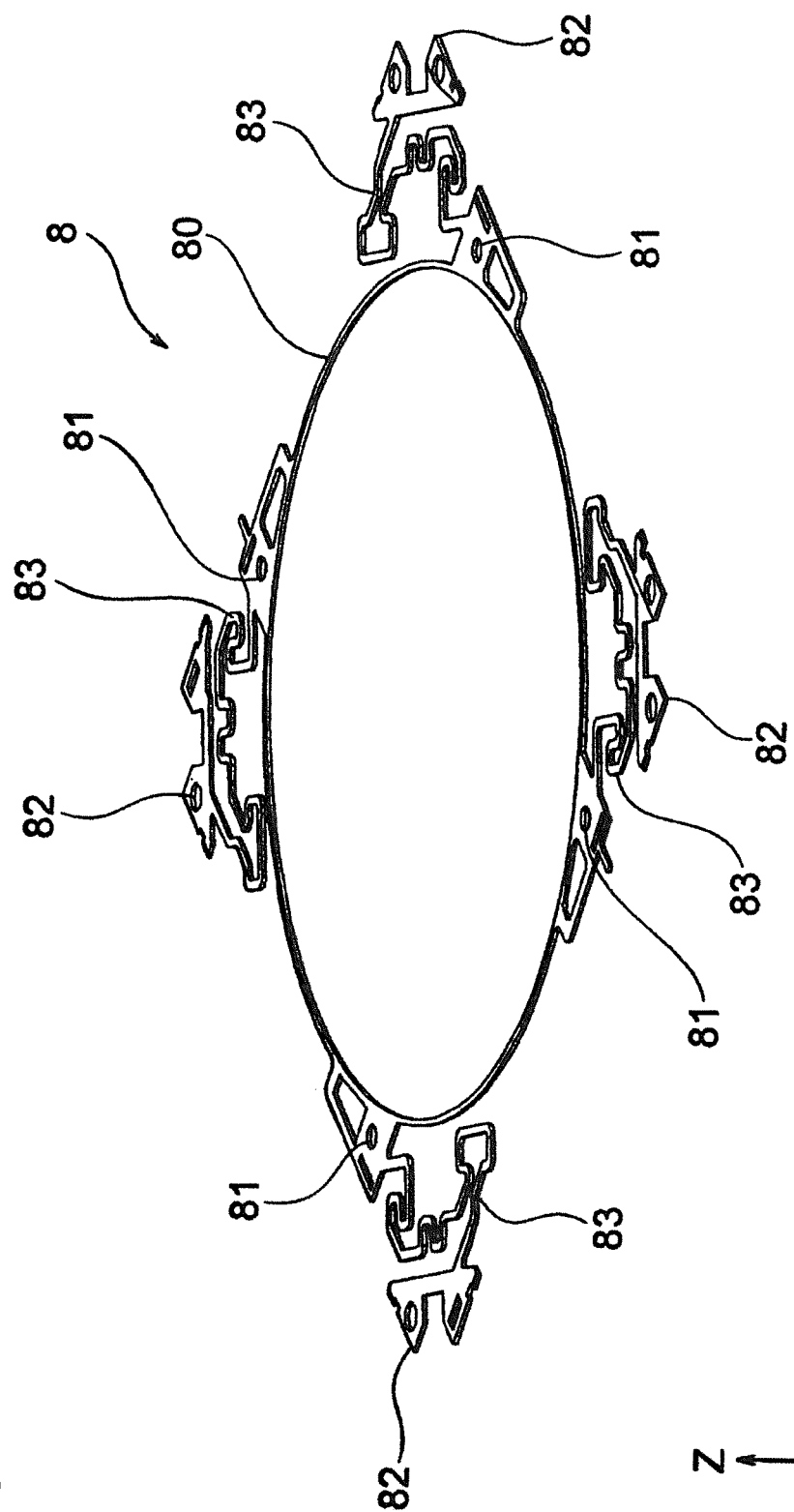
FIG. 9 is a perspective view of the back spring shown in FIG. 3.

As shown in FIG. 9, the back spring 8 is made of a plate spring (leaf spring) composed of a conductive material (e.g., metal) and supports the back of the lens holder 5 (holder back end 51). The back spring 8 includes a ring 80, holder fixation portions 81, base fixation portions 82, and arms 83.

The ring 80 has a circular ring outer shape and is disposed along the opening periphery of the cylinder 52 of the lens holder 5 (see FIG. 6B).

The holder fixation portions 81 are formed at substantially regular intervals at multiple points (four points in the illustrated example) along the circumferential direction of the ring 80. Each of the four holder fixation portions 81 has an engagement hole. The spring fixation convexes 510 formed on the holder back end 51 (see FIG. 6B) can be engaged with the engagement holes. Incidentally, the holder fixation portions 81 may be fixed to the holder back end 51 (opening periphery of the cylinder 52) via the fixation member (e.g., adhesive).

The base fixation portions 82 are arranged at the four corners of the back spring 8 and have engagement holes. The base fixation portions 82 are arranged by corresponding to the holder fixation portions 81 and are connected to the holder fixation portions 81 via the arms 83. The four base fixation portions 82 are fixed to corners of the base bottom 110 of the base member 11 (positions corresponding to the corners 1a-1d of the optical element drive device 1 shown in FIG. 1). For more detail, the spring fixation convexes 115 (FIG. 7) are engaged with the engagement holes of the four base fixation portions 82, and the four base fixation portions 82 are fixed to the base bottom 110.

The arms 83 have a meandering shape and are arranged at the corners of the back spring 8 by corresponding to the four base fixation portions 82. The four arms 83 connect the holder fixation portions 81 and the base fixation portions 82. The arms 83 bend at multiple points located between the holder fixation portions 81 and the base fixation portions 82 and extend away from the ring 80 toward the base fixation portions 82. A space is formed between the arms 83 and the ring 80. As shown in FIG. 10B, the sensor housing concave 114 is disposed in back of the space. To easily understand the position relation among the sensor magnet 6, the back spring 8, and the sensor unit 12, FIG. 10B does not illustrate the lens holder 5 or so.

When the arms 83 are deformed elastically as with the arms 33, the back spring 8 can hold the lens holder 5 connected to the ring 80 relatively movably to the base member 11 or so in the motion direction.

As shown in FIG. 3, the drive coil (focus coil) 4 has a substantially rectangular ring shape and is inserted into the coil insertion groove 58 of the lens holder 5 (see FIG 6A) and fixed to surround the outer circumferential surface of the lens holder 5. As shown in FIG. 2, the drive coil 4 is disposed to face the inner surface of the drive magnet 9. As shown in FIG. 4, a space having a predetermined length in a direction perpendicular to the motion axis C is formed between the outer circumferential surface of the drive coil 4 and the inner surface of the drive magnet 9. The drive coil 4 constitutes a voice coil motor for driving the lens (not illustrated) held by the lens holder 5 in the motion direction.

As shown in FIG. 2, clearances having a predetermined length in a direction perpendicular to the motion axis C are formed between the four corners of the drive coil 4 and the columns 113 of the base member 11, and gel damper members 14 exist in the clearances so as to connect the four corners of the drive coil 4 and the columns 113 of the base member 11. The corners of the drive coil 4 are connected to the columns 113 of the base member 11 via the dumber members 14.

The dumber members 14 are made of, for example, vibration absorbing materials (e.g., soft gel materials, soft adhesives). The dumber members 14 function as dumpers when the lens holder 5 is focus-driven in the motion direction to the base member 11 and are expected to reduce vibration. In the present embodiment, since the dumber members 14 are arranged near the four corners of the lens holder 5 (more accurately, the drive coil 4 fixed on the outer circumferential surface of the lens holder 5), the dumper members 14 at the four points can be arranged furthest from the center axis of the lens (not illustrated) and can function as dumpers at the maximum.

As shown in FIG. 2 and FIG. 3, the drive magnet 9 includes a first magnet 91, a second magnet 92, a third magnet 93, and a fourth magnet 94. The drive magnet 9 functions as a second magnetic field generator that generates a second magnetic field. The second magnetic field is applied to the drive coil 4 and is also applied to the sensor unit 12 as a bias magnetic field.

Each of the first magnet 91 to the fourth magnet 94 is a multi-pole magnet having multiple pairs of magnetic poles (a magnet having two or more poles; double-pole magnet in the present embodiment) and has a substantially rectangular parallelepiped outer shape. The first magnet 91 to the fourth magnet 94 are arranged radially outward from the drive coil 4 and are fixed to the outer periphery of the base bottom 110 of the base member 11 via the fixation members 13 (e.g., adhesive). The first magnet 91 to the fourth magnet 94 are arranged at the four sides forming the outer circumferential shape (rectangle) of the base bottom 110 and surround the outer periphery of the base bottom 110.

The movable section formed from the front spring 3, the drive coil 4, the lens holder 5, the sensor magnet 6, the balance magnet 7, and the back spring 8 is configured to be drivable by interaction between the second magnetic field generated by the drive magnet 9 and the magnetic field generated by the drive coil 4.

That is, when a drive electric current flows through the drive coil 4, a force in the motion axis direction acts on the drive coil 4 by cooperation effect between the drive coil 4 and the drive magnet 9 (VCM effect). Thus, the lens holder 5 can move back and forth in the motion axis direction along with the lens (not illustrated) to the base member 11. An autofocus (AF) operation can be carried out by moving the lens in the motion direction to the base member 11 along with the lens holder 5.

As shown in FIG. 3, the sensor magnet 6 is a multi-pole magnet (a magnet having two or more poles; double-pole magnet in the present embodiment) and is formed from one or more multi-pole magnets (two multi-pole magnets in the present embodiment). The sensor magnet 6 functions as a first magnetic field generator for generating a first magnetic field. Incidentally, the strength of the first magnetic field is different from that of the second magnetic field mentioned above.

The sensor magnet 6 is inserted into the sensor-magnet insertion groove 56 of the lens holder 5 shown in FIG. 6B and is embedded into the lens holder 5. The sensor magnet 6 is disposed to be changeable in relative position to the drive magnet 9 in accordance with the movement of the lens holder 5 in the motion direction.

The balance magnet (balance member) 7 is inserted into the balance-magnet insertion groove 57 of the lens holder 5 shown in FIG. 6B and is embedded into the lens holder 5. The balance magnet 7 is as heavy as the sensor magnet 6. The balance magnet 7 is disposed on the other side of the sensor magnet 6 across the opening of the cylinder 52 shown in FIG. 6B (or the lens not illustrated) and faces the sensor magnet 6 on a diagonal line of the lens holder 5 (a diagonal line connecting the corner 1b and the corner 1d shown in FIG. 1). When the balance magnet 7 is fixed to the lens holder 5 on which the sensor magnet 6 is fixed, it is possible to maintain the balance between one side of the lens holder 5 on which the sensor magnet 6 is fixed (the corner 1b side) and the other side of the lens holder 5 on which the balance magnet 7 is fixed (the corner 1d side).

As shown in FIG. 3, the sensor unit 12 carries out a detection based on a first magnetic field generated by the sensor magnet 6 and a second magnetic field generated by the drive magnet 9 at a predetermined detection position (a position of the base bottom 110 of the base member 11 corresponding to the corner 1b shown in FIG. 1). For more detail, the sensor unit 12 (sensor 120) detects a combined magnetic field of the first magnetic field and the second magnetic field and generates a detection signal corresponding to an angle formed by the direction of the combined magnetic field to a reference direction. For example, the reference direction is a direction of the combined magnetic field of magnetic fields generated by the first magnet 91 and the fourth magnet 94.

Figure 12:
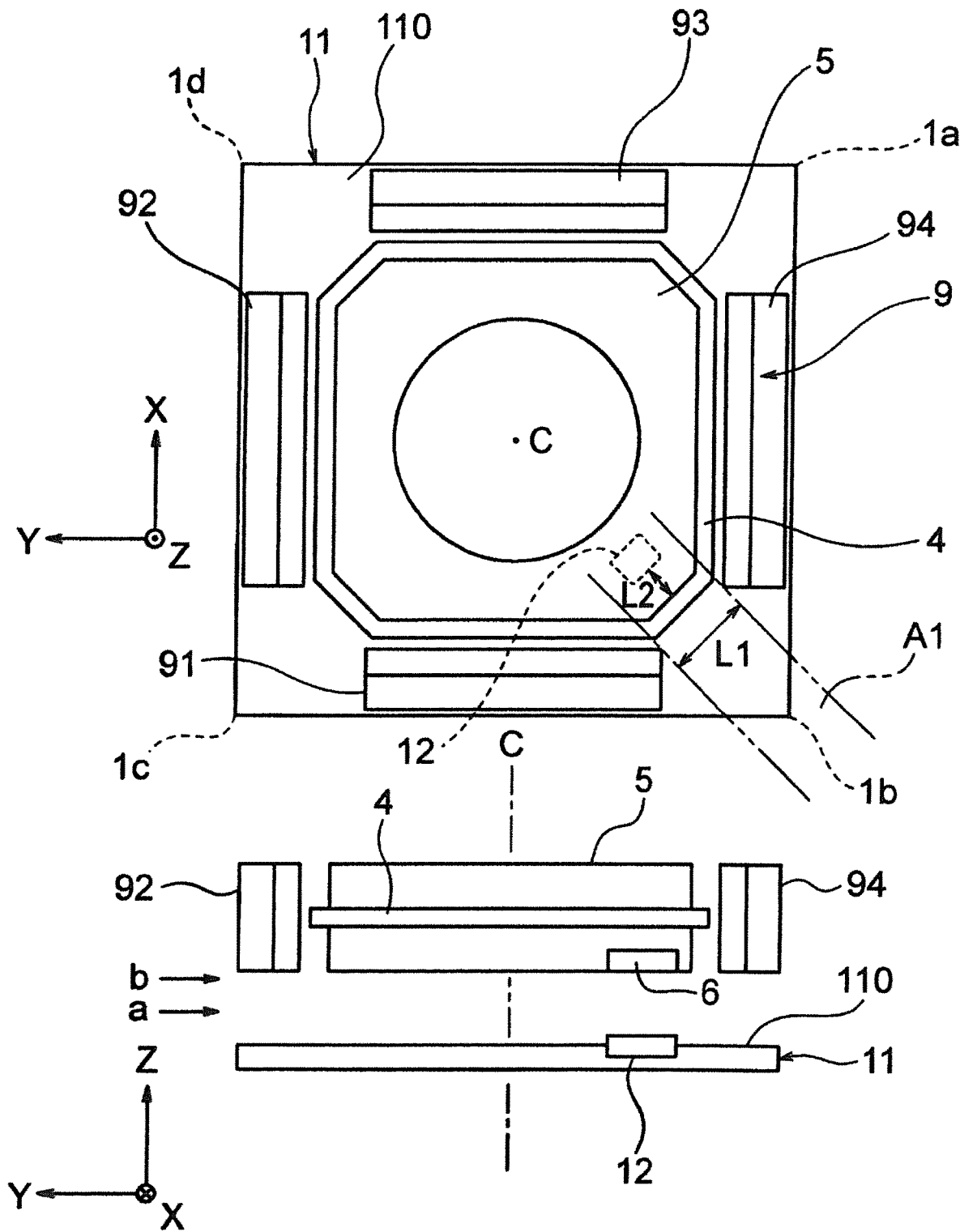

In the present embodiment, a position detection division for detecting a relative position of the movable section (e.g., lens holder 5) is formed from the sensor unit 12, the sensor magnet 6, and the drive magnet 9, and a control division not illustrated can determine a relative position of the lens holder 5 in the motion direction to a predetermined detection position based on a detected value of the detection signal of the sensor 120. Hereinafter, this respect is explained in detail with reference to FIG. 12 and FIG. 13. In FIG. 12, a schematic view of the optical element drive device 1 viewed from the direction along the motion axis C is illustrated in the upper part of the paper, and a schematic view of the optical element drive device 1 viewed from a direction perpendicular to the motion axis C is illustrated in the lower part of the paper. To prevent the figures from being complicated, only necessary matters for explanation are schematically illustrated.

Figure 13:
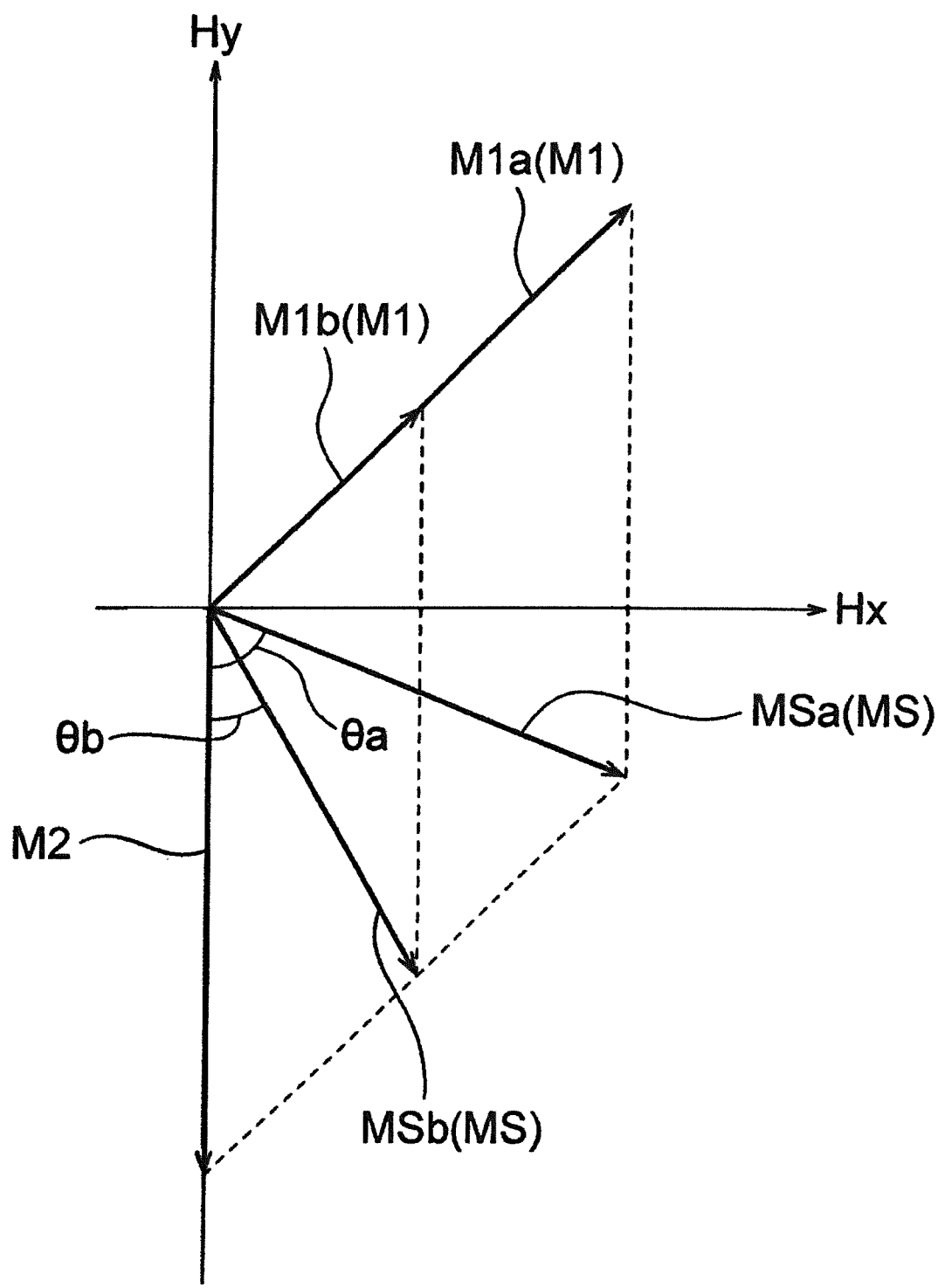
FIG. 13 is a view illustrating a change in a first magnetic field, a second magnetic field, and their combined magnetic field before and after the lens holder moves in the motion direction.

When the relative position of the sensor magnet 6 changes from the point "a" to the point "b" along the motion axis C as shown in FIG. 12, the direction of the first magnetic field M1 and the strength and direction of the second magnetic field M2 at the detection position (the disposed position of the sensor unit 12) do not change, but the strength of the first magnetic field M1 at the detection position changes from M1a to M1b as shown in FIG. 13. When the strength of the first magnetic field M1 at the detection position changes, the direction and strength of the combined magnetic field MS (M1+M2) of the first magnetic field M1 and the second magnetic field M2 also change from MSa (M1a+M2) to MSb (M1b+M2), and the detected value of the detection signal generated by the sensor 120 accordingly changes.

Thus, the angle formed by the combined magnetic field MS to the reference direction changes from θa to θb depending upon the strength of the first magnetic field. The strength of the first magnetic field M1 changes depending upon the distance between the detection position and the sensor magnet 6. Thus, the angle formed by the combined magnetic field MS to the reference direction changes depending upon the distance between the detection position and the sensor magnet 6. Thus, the distance between the detection position and the sensor magnet 6 can be obtained based on the detection signal of the sensor 120. This makes it possible to detect the relative position of the sensor magnet 6. Then, the relative position of the lens holder 5 in the motion direction to the detection position can be determined based on the relative position of the sensor magnet 6.

Figure 10A:
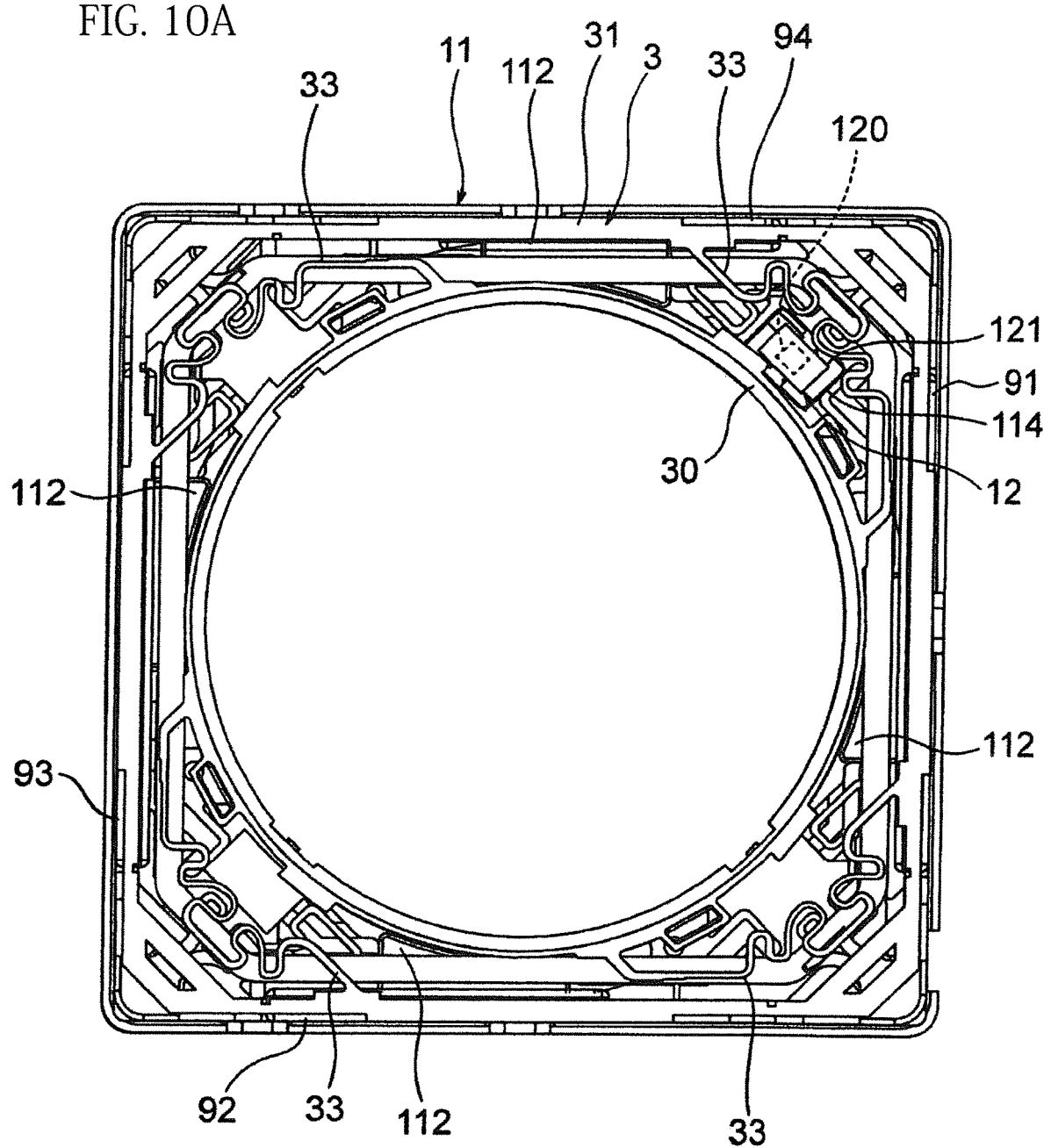
Figure 10B:
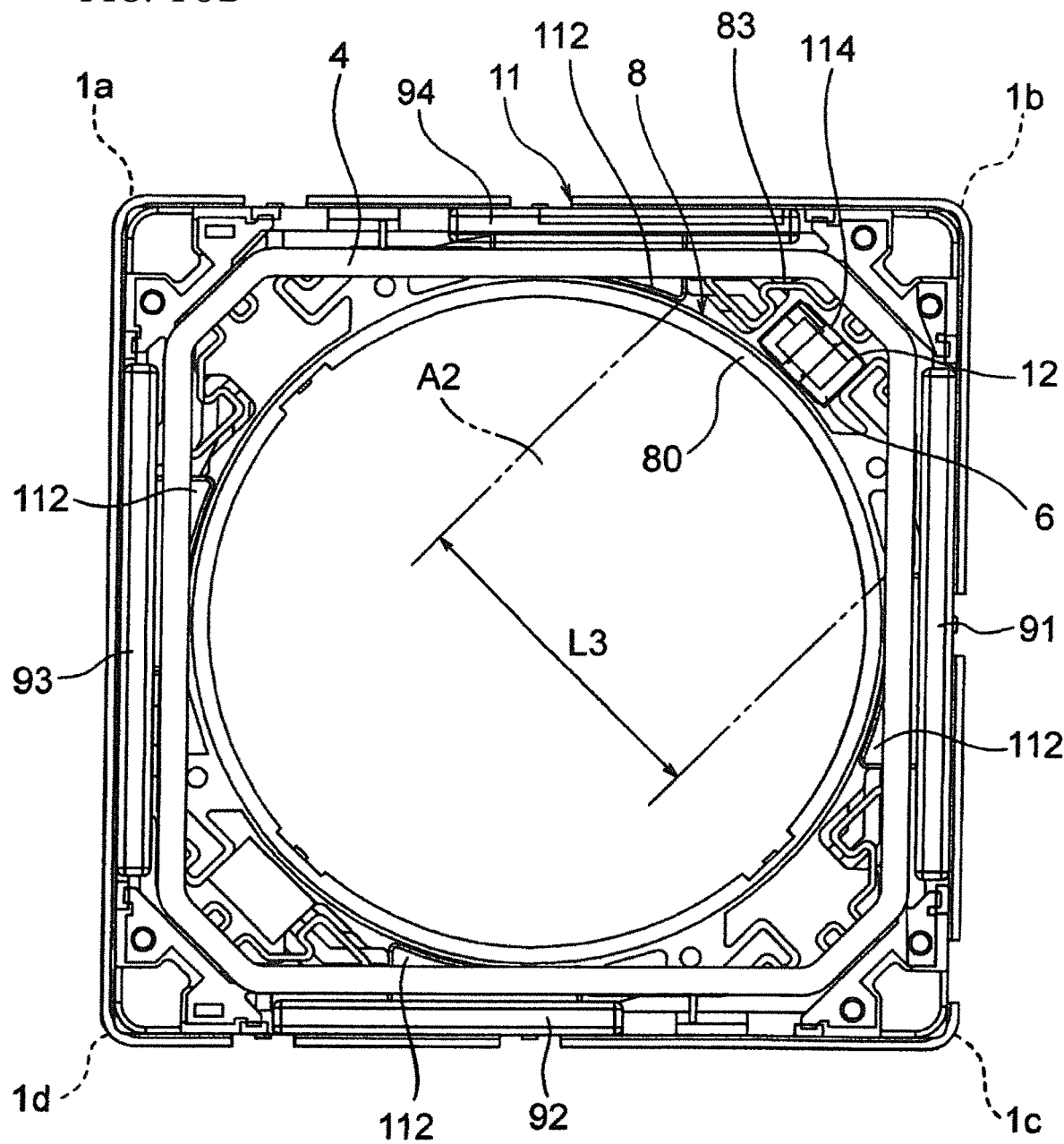

As shown in FIG. 10A, the sensor unit 12 includes the sensor 120 and a sensor package 121 for containing the sensor 120. The sensor package 121 is composed of, for example, resin and has a substantially rectangular parallelepiped outer shape. The sensor package 121 contains a space for containing the sensor 120.

The sensor 120 is an angle sensor capable of detecting an angle corresponding to a movement displacement of the sensor magnet 6 (first magnetic field generator). In the present embodiment, the sensor 120 is a tunnel magneto resistance (TMR) sensor. However, the sensor 120 may be any other sensors, such as a giant magneto resistance (GMR) sensor and an anisotropic magneto resistance (AMR) sensor. Preferably, the sensor 120 is preferably a sensor using magnetoresistive element.

In the present embodiment, as shown in FIG. 12, the sensor unit 12 is disposed within a region formed by the multiple drive magnets 9 (the first magnet 91 and the fourth magnet 94). For more detail, the sensor unit 12 is disposed within a region A1 sandwiched by the ends (near the end surfaces) of the first magnet 91 and the fourth magnet 94 arranged next to each other in the surroundings of the corner of the base bottom 110 of the base member 11 (a position corresponding to the corner 1b of the optical element drive device 1 shown in FIG. 1) and is sandwiched by the inner surfaces of the first magnet 91 and the fourth magnet 94. Incidentally, the region A1 corresponds to a region extending between the first magnet 91 and the fourth magnet 94 with the width L1, which is a distance between the end (end surface) of the first magnet 91 on the negative side of the Y-axis direction and the end (end surface) of the fourth magnet 94 on the negative side of the X-axis direction.

In the illustrated example, the distance between the sensor unit 12 and the first magnet 91 and the distance between the sensor unit 12 and the fourth magnet 94 are substantially the same, but may be different from each other.

The sensor unit 12 is disposed closer to the center of the base member 11 than to the drive coil 4 when viewed from the motion direction of the lens holder 5. That is, the sensor unit 12 is disposed inside the inner circumferential surface of the drive coil 4 having a ring shape. The sensor unit 12 (sensor package 121) is disposed at the position of the distance L2 from the inner circumferential surface of the drive coil 4. In the illustrated example, L2<L1 is satisfied. The distance L2 is preferably 0.1-0.5 mm (more preferably, 0.25-0.4 mm).

As shown in FIG. 10A, the sensor unit 12 is disposed inside a region surrounded by the inner circumferential surface of the drive coil 4 and the inner ring 30 of the front spring 3 (or the cylinder 52 of the lens holder 5 shown in FIG. 6A).

The sensor unit 12 is disposed within a region defined by the multiple base stoppers 112 formed on the base bottom 110 of the base member 11 (two base stoppers 112 arranged next to each other at the corner 1*b* shown in FIG. 1). For more detail, as shown in FIG. 10B, the sensor unit 12 is disposed within a region A2 sandwiched by the ends (near the end surfaces) of the two base stoppers 112 arranged next to the sensor unit 12 when viewed from the motion direction of the lens holder 5. Incidentally, the region A2 corresponds to a region extending between either of the base stoppers 112 and the other base stopper 112 with the width L3, which is a distance between either of the base stoppers 112 and the other base stopper 112 arranged next to the sensor unit 12.

When a virtual line (linear line) extending in the longitudinal direction of the first magnet 91, a virtual line (linear line) extending in the longitudinal direction of the second magnet 92, a virtual line (linear line) extending in the longitudinal direction of the third magnet 93, and a virtual line (linear line) extending in the longitudinal direction of the fourth magnet 94 are supposed, the sensor unit 12 is disposed within a region of a virtual rectangular ring formed by crossing of the above-mentioned virtual lines.

The sensor unit 12 is disposed so as not to overlap with the back spring 8 (the arm 83 and the ring 80) when viewed from the motion direction of the lens holder 5. For more detail, the sensor unit 12 is disposed within a region sandwiched by the ring 80 of the back spring 8 and the arm 83 (a region between the ring 80 and the arm 83). In other words, the arm 83 extends around the sensor unit 12 while bending to avoid the sensor unit 12 (so as not to overlap with the sensor unit 12) when viewed from the motion direction of the lens holder 5.

In FIG. 10B, the sensor magnet 6 is illustrated in front of the sensor unit 12, but the position of the sensor unit 12 and the position of the sensor magnet 6 substantially correspond to each other when viewed from the motion direction of the lens holder 5, and the sensor magnet 6 overlaps with the sensor unit 12 when viewed from the motion direction of the lens holder 5. As with the sensor unit 12, the sensor magnet 6 is thereby disposed within the region Al (see FIG. 12) and the region A2.

Figure 11:
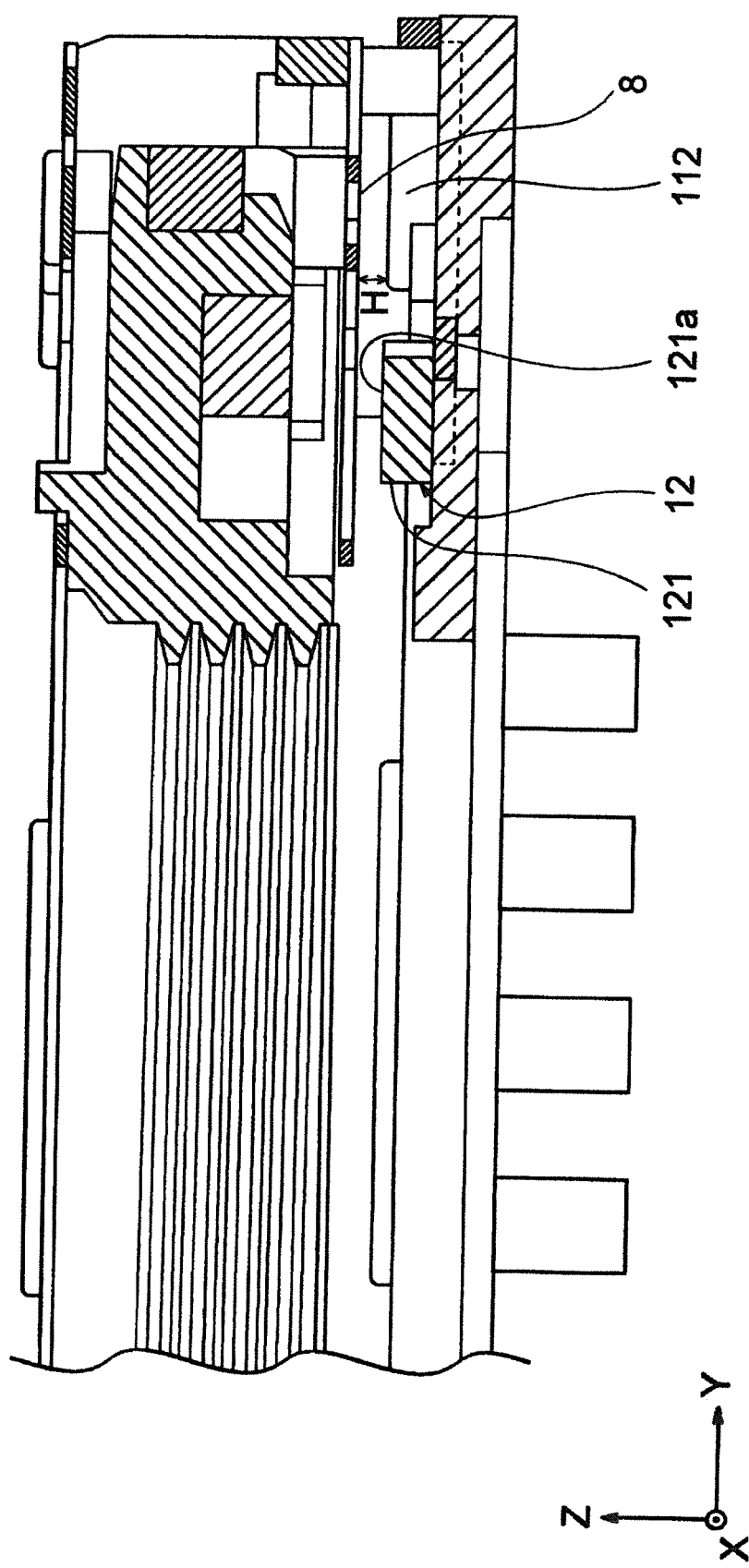
FIG. 11 is a partial cross-sectional view for explaining a height relation among the back spring, a stopper, and the sensor unit.

As shown in FIG. 11, the sensor unit 12 is disposed so that a front end 121*a* of the sensor package 121 is located forward from the front end of the base stopper 112 and is located backward from the back end of the back spring 8. That is, the sensor unit 12 is disposed so that the front end 121*a* is located in a space between the base stopper 112 and the back spring 8 (height H).

As shown in FIG. 12, the sensor unit 12 is fixed at a position facing the sensor magnet 6 along the motion direction of the lens holder 5, and the sensor magnet 6 is disposed in front of the sensor unit 12. Incidentally, the position of the sensor magnet 6 is not limited to the illustrated one. The sensor magnet 6 may be disposed so as not to overlap with the sensor unit 12 when viewed from the motion direction of the lens holder 5.

In FIG. 10A, although not illustrated in detail, a fixation member for fixing the sensor unit 12 (e.g., adhesive) is filled in the sensor housing concave 114 of the base member 11, and the entire outer surface of the sensor unit 12 is covered with this fixation member. In FIG. 12, the sensor unit 12 thereby actually faces the sensor magnet 6 via the fixation member.

In the present embodiment, as shown in FIG. 3, the sensor unit 12, the balance magnet 7, and two protrusion pieces 23 formed on the yoke 2 are arranged so as not to overlap with each other when viewed from the motion direction of the lens holder 5. That is, the sensor unit 12 and the balance magnet 7 are arranged on one side and the other side of a diagonal line connecting the corner 1*b* and the corner 1*d* of the optical element drive device 1 shown in FIG. 1, and the two protrusion pieces 23 are arranged on one side and the other side of a diagonal line perpendicular to the above-mentioned diagonal line.

Figure 14:
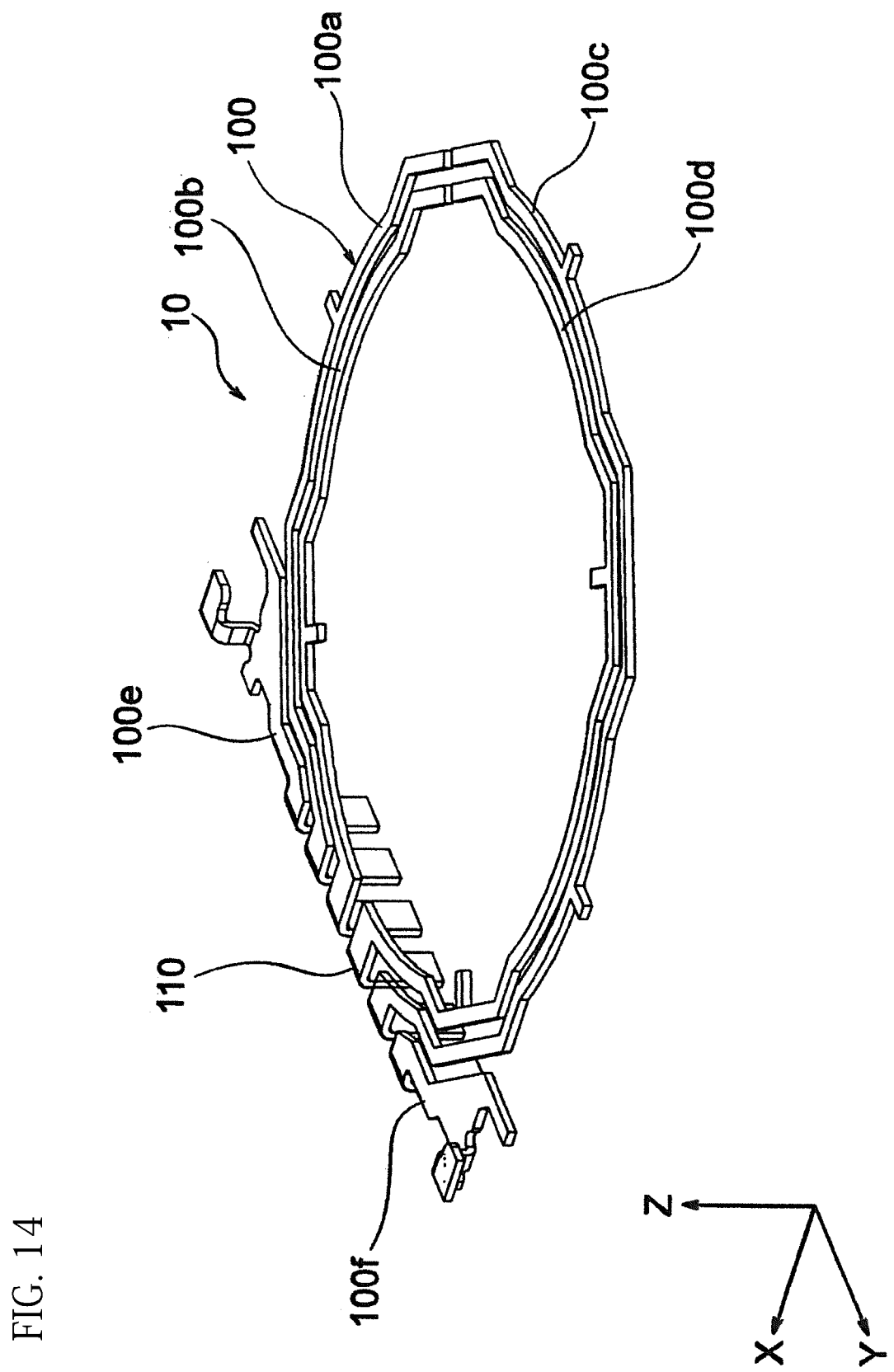
FIG. 14 is a perspective view of a wiring shown in FIG. 3.

As shown in FIG. 14, the circuit unit 10 includes a wiring 100 and a connector 110 and is disposed inside the base bottom 110 of the base member 11 (see FIG. 7). The wiring 100 is made of a metal good conductor and has six wires (wiring pattern) 100*a*-100*f* in total.

One ends of the wires 100*a*-100*d* are connected to the sensor 120 of the sensor unit 12 shown in FIG. 10A, and the other ends of the wires 100a-100d are connected to the connector 110. The detection signal of the sensor 120 can be transmitted to an external circuit via the wires 100*a*-100*d*.

One ends of the wires 100*e* and 100*f* are connected to the back spring 8 (near the base fixation portions 82), and the other ends of the wires 100*e* and 100*f* are connected to the connector 110. Although not illustrated in detail, the back spring 8 is electrically connected to the drive coil 4, and electric current can be supplied to the drive coil 4 via the wires 100*e* and 100*f*. Unlike the back spring 8, the front spring 3 is not provided with any electrically conductive passage function.

As shown in FIG. 1, the connector 110 is disposed on a lateral part of the optical element drive device 1 and is exposed from inside to outside the base member 11. The connector 110 is connected to, for example, an external board that transmits control signal, electric power for driving the optical element drive device 1, etc. to the optical element drive device 1.

In the present embodiment, the sensor unit 12 carries out a detection based on a first magnetic field generated by the sensor magnet 6 and a bias magnetic field different from the first magnetic field (the second magnetic field generated by the drive magnet 9 in the present embodiment). In this structure, unlike the prior arts, the sensor 120 does not carry out a detection based on only the strength of the first magnetic field, but carries out a detection based on interaction (correlation) between the first magnetic field and the bias magnetic field. In that case, both of the first magnetic field and the bias magnetic field change even if the external environment changes, a detected value of the detection signal of the sensor 120 can be prevented from including a change of the external environment as an error. Thus, the position of the sensor magnet 6 can accurately be detected based on the detection signal of the sensor 120, and the relative position of, for example, the lens holder 5 to the base member 11 or so can accurately be detected regardless of change in external environment.

The sensor 120 detects a combined magnetic field of the first magnetic field and the bias magnetic field (the second magnetic field in the present embodiment). Thus, the change of the combined magnetic field (angle change) can be determined based on the detection signal of the sensor 120. Based on this change, the position of the sensor magnet 6 can be detected, and the relative position of, for example, the lens holder 5 to the base member 11 can be detected.

The second magnetic field generated by the drive magnet 9 is applied to the sensor unit 12 as the bias magnetic field. Thus, the second magnetic field can be utilized as the bias magnetic field and applied to the sensor unit 12 without separately preparing and disposing a bias magnetic field generator for applying a bias magnetic field to the sensor unit 12.

The lens holder 5 is configured to be drivable by interaction of the second magnetic field generated by the drive magnet 9 and the magnetic field generated by the drive coil 4. Thus, the present embodiment can constitute a moving-coil type optical element drive device 1.

The sensor unit 12 includes the sensor 120 capable of detecting an angle based on a movement displacement of the sensor magnet 6. In general, when a hall sensor is employed as a magnetic detection element, the larger the movement displacement of the sensor magnet 6 to a predetermined detection position is, the smaller the change of the detection signal of the sensor 120 is, and it may be difficult to ensure the linearity of the detected value of the detection signal. On the other hand, when the sensor 120 is employed as a magnetic detection element, even if the displacement of the sensor magnet 6 to a predetermined detection position is large, the change of the detection signal of the sensor 120 is hard to be small, and the linearity of the detected value of the detection signal can be ensured sufficiently. In this respect as well, based on the detection signal of the sensor 120, it is thereby possible to accurately detect the position of the sensor magnet 6 and the relative position of, for example, the lens holder 5 to the base member 11.

Even if the strengths of the first magnetic field and the bias magnetic field (the second magnetic field in the present embodiment) change due to change in external environment, the relative angle of their combined magnetic field is constant regardless of change in external environment, and the relative position of, for example, the lens holder 5 to the base member 11 can be detected accurately regardless of change in external environment.

The sensor unit 12 is disposed within a region defined by the multiple drive magnets 9 (the first magnet 91 and the fourth magnet 94). In this region, unnecessary magnetic fields from outside are blocked by the multiple drive magnets 9, and the detection of the sensor 120 can be carried out with high detection accuracy while the influence of external magnetic fields is reduced.

The sensor unit 12 is disposed closer to the center of the base member 11 than to the drive coil 4 when viewed from the motion direction of the lens holder 5. Thus, the sensor unit 12 is disposed away from the drive coil 4, and the magnetic field generated by the drive coil 4 can be prevented from being detected incorrectly by the sensor 120. In addition, the sensor unit 12 is disposed relatively radially inside the base member 11, and the device can thereby be downsized overall.

In the lens holder 5, the balance magnet 7 is disposed on the other side of the sensor magnet 6 across the lens (not illustrated). Thus, one side of the lens holder 5 on which the sensor magnet 6 is disposed and the other side of the lens holder 5 on which the balance magnet 7 is disposed are balanced, and it is possible to prevent the movement of the lens holder 5 in the motion direction from being hindered.

The multiple base stoppers 112 for regulating the movement of the lens holder 5 in the motion direction are arranged away from each other on the base member 11, and the sensor unit 12 is disposed within a region sandwiched by the ends of the base stoppers 112 next to each other when viewed from the motion direction of the lens holder 5. In that case, the sensor unit 12 is disposed away from the base stoppers 112, and the base stoppers 112 can thereby regulate the movement of the lens holder 5 in the motion direction without being hindered by the sensor unit 12. When the sensor unit 12 is disposed within the above-mentioned region, the position of the sensor magnet 6 can be detected further accurately by the sensor 120.

The sensor 12 is disposed so as not to overlap with the back spring 8 for supporting the back of the lens holder 5 when viewed from the motion direction of the lens holder 5. Thus, when the back spring 8 bends in the motion direction in accordance with the movement of the lens holder 5 in the motion direction, the back spring 8 can be prevented from contacting with the sensor unit 12, and the movement of the lens holder 5 in the motion direction can be prevented from being hindered.

The sensor unit 12 is disposed so that the front end of the sensor unit 12 is located forward from the front ends of the base stoppers 112 for regulating the movement of the lens holder 5 in the motion direction and is located backward from the back end of the back spring 8 for supporting the back of the lens holder 5. In this case as well, as mentioned above, the back spring 8 can be prevented from contacting with the sensor unit 12, and the movement of the lens holder 5 in the motion direction can be prevented from being hindered.

The sensor unit 12 faces the sensor magnet 6 via the fixation member for fixing the sensor unit 12 to the base bottom 110. When the sensor unit 12 is disposed at a position facing the sensor magnet 6, the first magnetic field generated by the sensor magnet 6 can be detected with high detection accuracy by the sensor 120. When the sensor unit 12 is fixed to the base bottom 110 using the fixation member so that a part of the fixation member is disposed between the sensor unit 12 and the sensor magnet 6, the position of the sensor unit 12 can be prevented from shifting. The sensor unit 12 is not fixed to the base bottom 110 via a flexible printed circuit (FPC) substrate, but is directly fixed to the base bottom 110. This makes it possible to achieve the low profile of the optical element drive device 1 and the low pricing of the optical element drive device 1 as no FPC substrate is used.

In the present embodiment, when viewed from a direction perpendicular to the motion direction of the lens holder 5, either of the protrusion pieces 23 is located at the end of the yoke 2 on one side of the sensor unit 12, and the other protrusion piece 23 is located at the end of the yoke 2 on the other side of the sensor unit 12. Thus, when the protrusion pieces 23 are fixed to the protrusion-piece insertion grooves 53 of the lens holder 5, the protrusion pieces 23 can regulate the movement of the lens holder 5 in the rotation direction and prevent the position of the lens holder 5 from shifting in the rotation direction. When the lens holder 5 collides with the yoke 2, the impacts can be dispersed via the protrusion pieces 23.

The sensor magnet 6 is embedded in the lens holder 5 (sensor-magnet insertion groove 56). Thus, the sensor magnet 6 can be fixed to the lens holder 5 without being exposed outside and can effectively be protected from, for example, impacts from outside.

Second Embodiment

Figure 15:
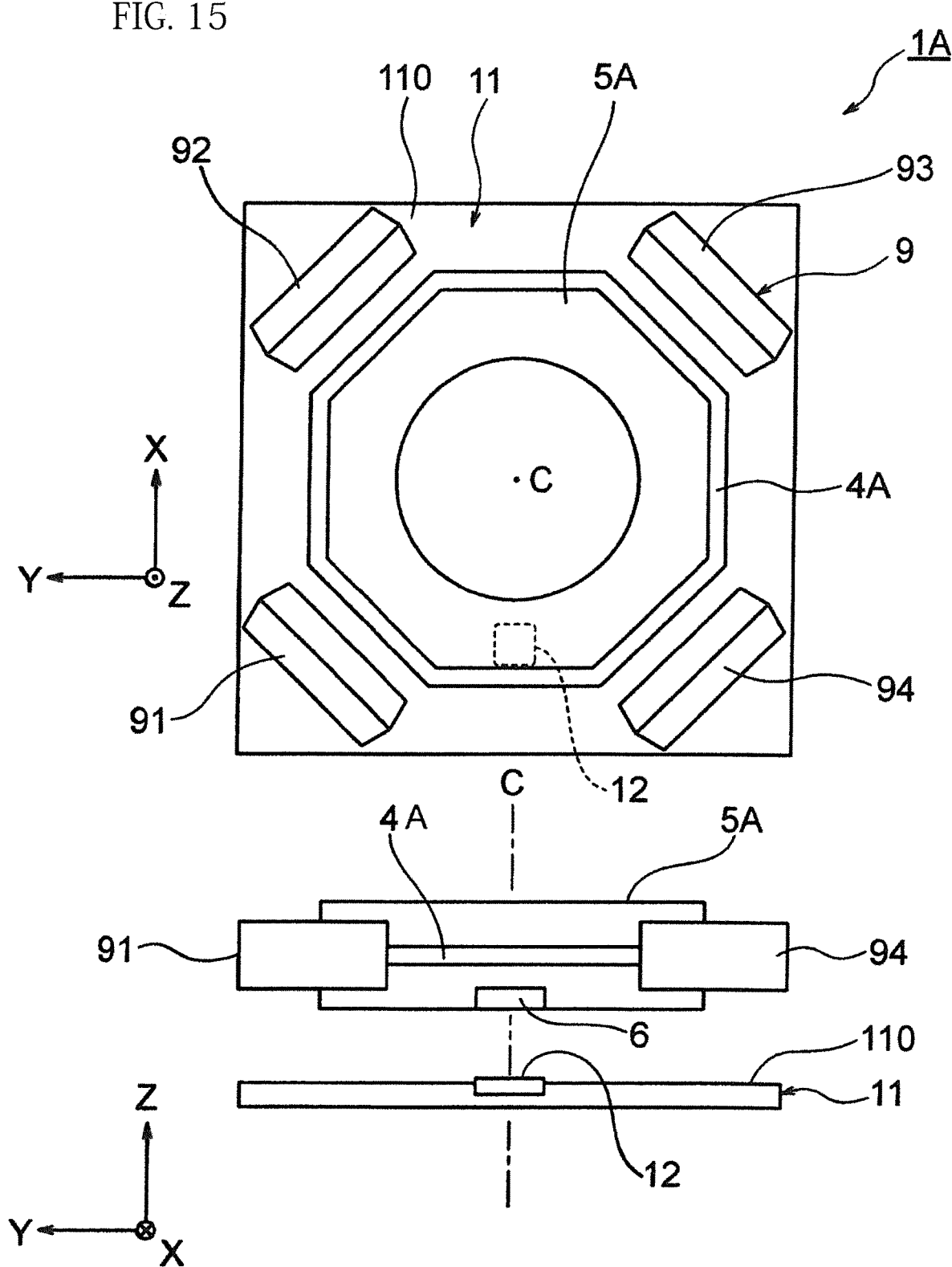
FIG. 15 is a schematic view for explaining a position relation among a drive coil, a sensor magnet, a drive magnet, and a sensor unit of an optical element drive device according to Second Embodiment of the present invention.

Except for the following respects, an optical element drive device 1A according to Second Embodiment shown in FIG. 15 has a similar structure and demonstrates similar effects to the optical element drive device 1 according to First Embodiment. In FIG. 15, members common with those of the optical element drive device 1 according to First Embodiment are provided with common references and are not partly explained. In FIG. 15, a schematic view of the optical element drive device 1A viewed from a direction along the motion axis C is illustrated on the upper part of the paper, and a schematic view of the optical element drive device 1A viewed from a direction perpendicular to the motion axis C is illustrated on the lower part of the paper. To prevent the figure from being complicated, only necessary components for explanation are illustrated schematically.

As shown in FIG. 15, a drive coil 4A is different from the drive coil 4 according to First Embodiment in that the drive coil 4A has an octagonal ring shape viewed from a motion direction of the movable section (e.g., lens holder 5A). A lens holder 5A is different from the lens holder 5 according to First Embodiment in that the lens holder 5A has an octagonal outer circumferential shape viewed from the motion direction of the lens holder 5A. The first magnet 91 to the fourth magnet 94 constituting the drive magnet 9 are arranged at regular intervals on the outer side of four sides among eight sides forming the outer shape of the lens holder 5A (substantially octagonal shape).

The sensor unit 12 is fixed at a position facing the sensor magnet 6 in the motion direction, and the sensor magnet 6 is disposed in front of the sensor unit 12. In FIG. 15, although not illustrated in detail, the sensor unit 12 actually faces the sensor magnet 6 via a fixation member (e.g., adhesive).

As with First Embodiment, the sensor unit 12 of the present embodiment is disposed within a region defined by a plurality of drive magnets 9 (the first magnet 91 and the fourth magnet 94). That is, the sensor unit 12 is disposed between the first magnet 91 and the fourth magnet 94 so as to be sandwiched by the inner surfaces of the first magnet 91 and the fourth magnet 94. In the region, the sensor 120 of the present embodiment can thereby also carry out a detection with high detection accuracy by external magnetic fields while the first magnet 91 to the fourth magnet 94 block unnecessary magnetic fields from outside. Incidentally, the sensor unit 12 is disposed equally away from the first magnet 91 and the fourth magnet 94, but may be disposed closer to the first magnet 91 or the fourth magnet 94.

Third Embodiment

Except for the following respects, an optical element drive device 1B according to Third Embodiment shown in FIG. 16A has a similar structure and demonstrates similar effects to the optical element drive device 1 according to First Embodiment. In FIG. 16A, members common with those of the optical element drive device 1 according to First Embodiment are provided with common references and are not partly explained. In FIG. 16A, the optical element drive device 1B is only partly illustrated.

The optical element drive device 1B includes a sensor unit 12B and a bias magnet 15 disposed inside the sensor unit 12B. The sensor unit 12B is different from the sensor unit 12 according to First Embodiment in that the bias magnet 15 is disposed inside the sensor package 121. Incidentally, the bias magnet 15 constitutes a part of the fixed section.

The bias magnet 15 is formed from one or more (one in the present embodiment) multi-pole magnets (double-pole magnet in the present embodiment) and is disposed in the surroundings of the sensor 120 (near the sensor surface of the sensor 120). The bias magnet 15 has a substantially rectangular parallel-piped outer shape. The length of the bias magnet 15 in a direction perpendicular to a magnet-pole direction of the bias magnet 15 (a direction connecting the N pole and the S pole) is smaller than that of the longer sides of the sensor 120. Incidentally, the magnet-pole direction of the bias magnet 15 corresponds to a direction connecting the corner 1b and the corner 1d of the optical element drive device 1 shown in FIG. 1 (the vertical direction of the paper of FIG. 16A).

The bias magnet 15 is a bias magnetic field generator for generating a bias magnetic field and applies the bias magnetic field to a sensor unit 12B (sensor 120). In the above-mentioned embodiments, a second magnetic field generated by the drive magnet 9 is applied to the sensor unit 12 as a bias magnetic field. In the present embodiment, however, a bias magnetic field generated by the bias magnet 15 is mainly applied. The strength of the bias magnetic field generated by the bias magnet 15 is different from that of the second magnetic field generated by the drive magnet 9 and is larger than the second magnetic field. The sensor 120 carries out a detection based on the first magnetic field generated by the sensor magnet 6 (see FIG. 3) and the bias magnetic field generated by the bias magnet 15. That is, the sensor 120 detects a combined magnetic field of the first magnetic field and the bias magnetic field from the bias magnet 15. Incidentally, the sensor 120 may carry out a detection based on a combined magnetic field of the first magnetic field, the bias magnetic field from the bias magnet 15, and a second magnetic field generated from the drive magnet 9 (the first magnet 91 and the fourth magnet 94).

In the present embodiment, a bias magnetic field generator (bias magnet 15) is disposed in the surroundings of the sensor 120 included in the sensor unit 12B. Thus, the bias magnetic field having a sufficient strength can constantly be supplied to the sensor 120, and even if a unnecessary external magnetic field is applied to the sensor 120, it is possible to minimize the effect and to sufficiently ensure the reliability of the detected value of the detection signal of the sensor 120. When the temperature around the sensor unit 12B changes, the temperatures of both of the sensor 120 and the bias magnet 15 change, and temperature characteristics of the sensor 120 can thereby be favorable.

In the present embodiment, the bias magnet 15 is incorporated in the sensor package 121. Thus, the sensor unit 12 can be downsized compared to when the bias magnet 15 is disposed outside the sensor package 121. Even if an external impact due to falling etc. acts on the sensor unit 12B, the position of the bias magnet 15 to the sensor 120 can be prevented from shifting. It is not necessary to strictly consider the tolerance and mounting error of the bias magnet 15. It is thereby possible to reduce the instability during production and to simplify the production process.

In the present embodiment, the bias magnetic field from the bias magnet 15 is applied to the sensor 120. Thus, even if the second magnetic field generated by the drive magnet 9 is insufficiently applied to the sensor 120 due to the structure of the diver magnet 9, this can be substituted by the bias magnet, and effects similar to those of the optical element drive device 1 according to First Embodiment can be demonstrated.

That is, in the present embodiment, since the detection is carried out based on the first magnetic field generated by the sensor magnet 6 and the bias magnetic field generated by the bias magnet 15, even if the external environment changes, both of the magnetic fields changes, and a detected value of the detection signal of the sensor 120 can be prevented from including a change of the external environment as an error. Thus, based on the detection signal of the sensor 120, it is thereby possible to accurately detect the position of the sensor magnet 6 and a relative position of, for example, the lens holder 5 to the base member 11 regardless of change in external environment.

Even if the strengths of the first magnetic field and the bias magnetic field from the bias magnet 15 change due to change in external environment, the relative angle of their combined magnetic field is constant regardless of change in external environment, and the relative position of, for example, the lens holder 5 to the base member 11 can be detected accurately regardless of change in external environment.

Fourth Embodiment

Figure 17:
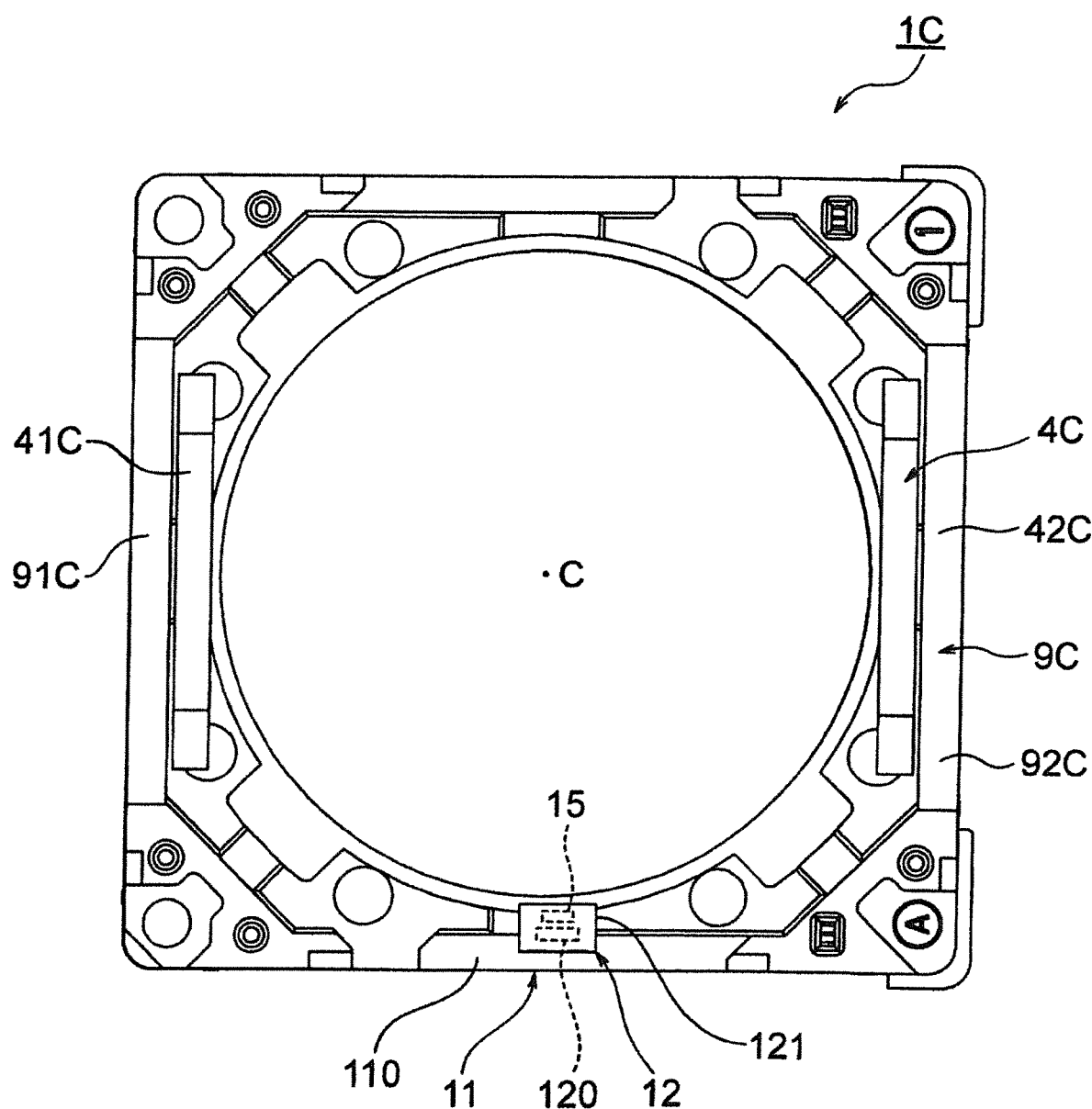
FIG. 17 is a partial schematic view of an optical element drive device according to Fourth Embodiment of the present invention.
Figure 18:
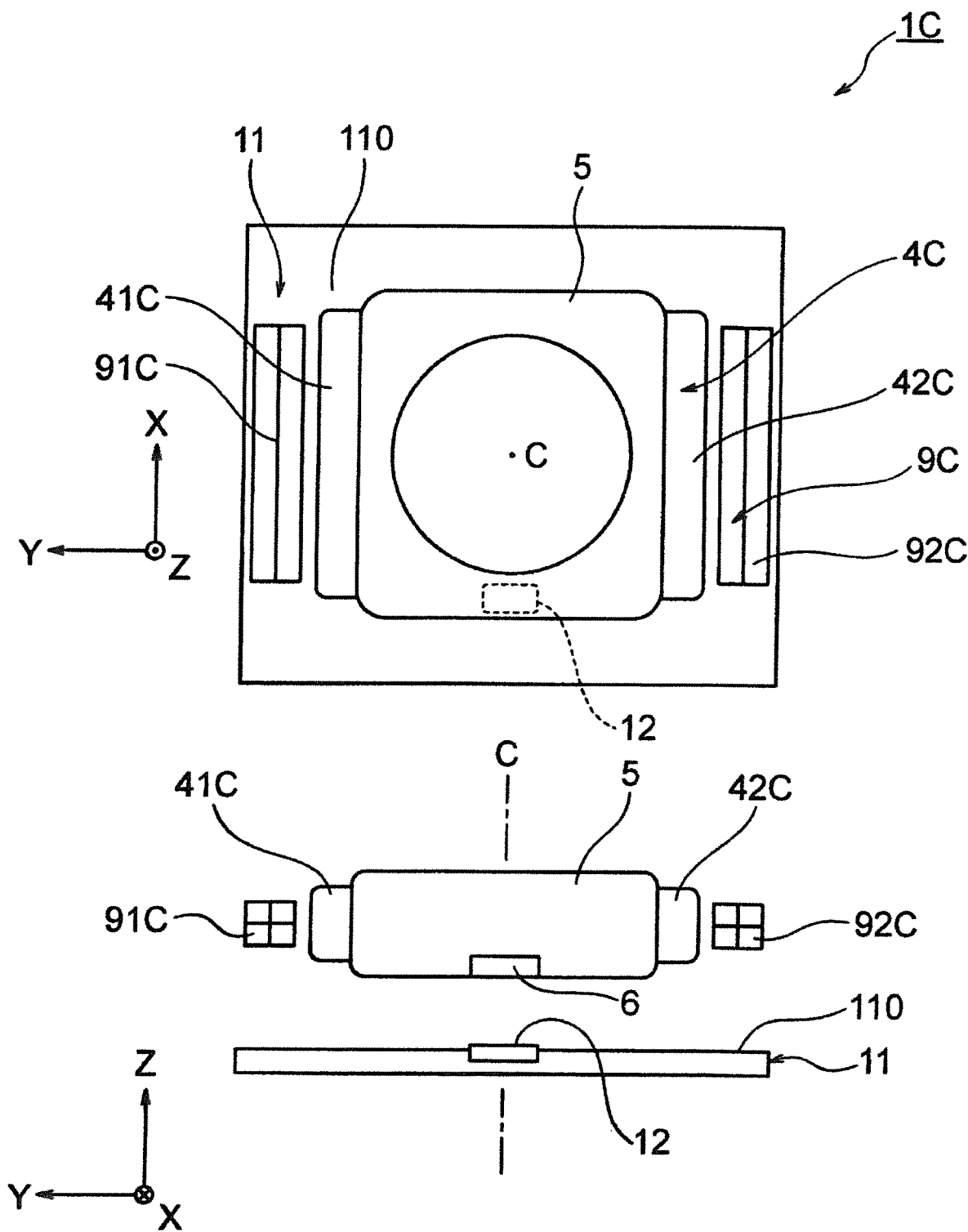
FIG. 18 is a schematic view for explaining a position relation among a drive coil, a sensor magnet, a drive magnet, and a sensor unit of the optical element drive device shown in FIG. 17.

Except for the following respects, an optical element drive device 1C according to Fourth Embodiment shown in FIG. 17 and FIG. 18 has a similar structure and demonstrates similar effects to the optical element drive device 1 according to First Embodiment. In FIG. 17 and FIG. 18, members common with those of the optical element drive device 1 according to First Embodiment are provided with common references and are not partly explained. To easily understand a positional relation between a drive magnet 9C and the sensor unit 12, FIG. 17 does not illustrate the lens holder 5 or so. In FIG. 18, a schematic view of the optical element drive device 1C viewed from a direction along the motion axis C is illustrated on the upper part of the paper, and a schematic view of the optical element drive device 1C viewed from a direction perpendicular to the motion axis C is illustrated on the lower part of the paper. To prevent the figure from being complicated, only necessary components for explanation are illustrated schematically.

As shown in FIG. 17, a drive coil 4C includes a first coil 41C and a second coil 42C. The drive coil 4C (the first coil 41C and the second coil 42C) is different from the drive coil 4 according to First Embodiment in that the drive coil 4C has a linear shape (rectangular) when viewed from the motion direction of the lens holder 5. Although not illustrated in detail, each of the first coil 41C and the second coil 42C constitutes a substantially rectangular ring coil when viewed from a direction perpendicular to the motion direction C (Y-axis direction).

As shown in FIG. 18, the first coil 41C and the second coil 42C are fixed on the outer circumferential surface of the lens holder 5. Among four sides forming the outer shape (substantially rectangular) of the lens holder 5, the first coil 41C and the second coil 42C are arranged on two sides facing each other in the Y-axis direction.

The drive magnet 9C is different from the drive magnet 9 according to First Embodiment in that the drive magnet 9C is formed from two magnets of a first magnet 91C and a second magnet 92C. Each of the first magnet 91C and the second magnet 92C is a multi-pole magnet (four-pole magnet in the present embodiment). Among four sides forming the outer shape (substantially rectangular) of the base bottom 110 of the base member 11, the first magnet 91C and the second magnet 92C are arranged on two sides facing each other in the Y-axis direction.

The first magnet 91C corresponds to the first coil 41C and is disposed outside it, and the first magnet 91C and the first coil 41C face each other. The second magnet 92C corresponds to the second coil 42C and is disposed outside it, and the second magnet 92C and the second coil 42C face each other.

Among the four sides forming the outer shape (substantially rectangular) of the base bottom 110, the sensor unit 12 is disposed at a substantially central part of the side located between the sides on which the first magnet 91C and the second magnet 92C are arranged. As with Third Embodiment, the bias magnet 15 is disposed inside the sensor package 121 and faces the sensor 120.

The sensor unit 12 is fixed at a position facing the sensor magnet 6 in the motion direction, and the sensor magnet 6 is disposed in front of the sensor unit 12. In FIG. 18, although not illustrated in detail, the sensor unit 12 is actually fixed inside the sensor housing concave 114 by a fixation member (e.g., adhesive) and faces the sensor magnet 6 via the fixation member.

As with First Embodiment, the sensor unit 12 of the present embodiment is disposed within a region formed by a plurality of drive magnets 9C (the first magnet 91C and the second magnet 92C). That is, the sensor unit 12 is disposed between the first magnet 91C and the second magnet 92C so as to be sandwiched by the inner surfaces of the first magnet 91C and the second magnet 92C. In the region, the sensor 120 of the present embodiment can also carry out a detection with high detection accuracy without being affected by external magnetic fields while the first magnet 91C and the second magnet 92C block unnecessary magnetic fields from outside. Incidentally, the sensor unit 12 is disposed equally away from the first magnet 91C and the second magnet 92C, but may be disposed closer to the first magnet 91C or the second magnet 92C.

Hereinbefore, embodiments of the present invention are explained, but the present invention can employ any other embodiments as below.

Figure 16B:
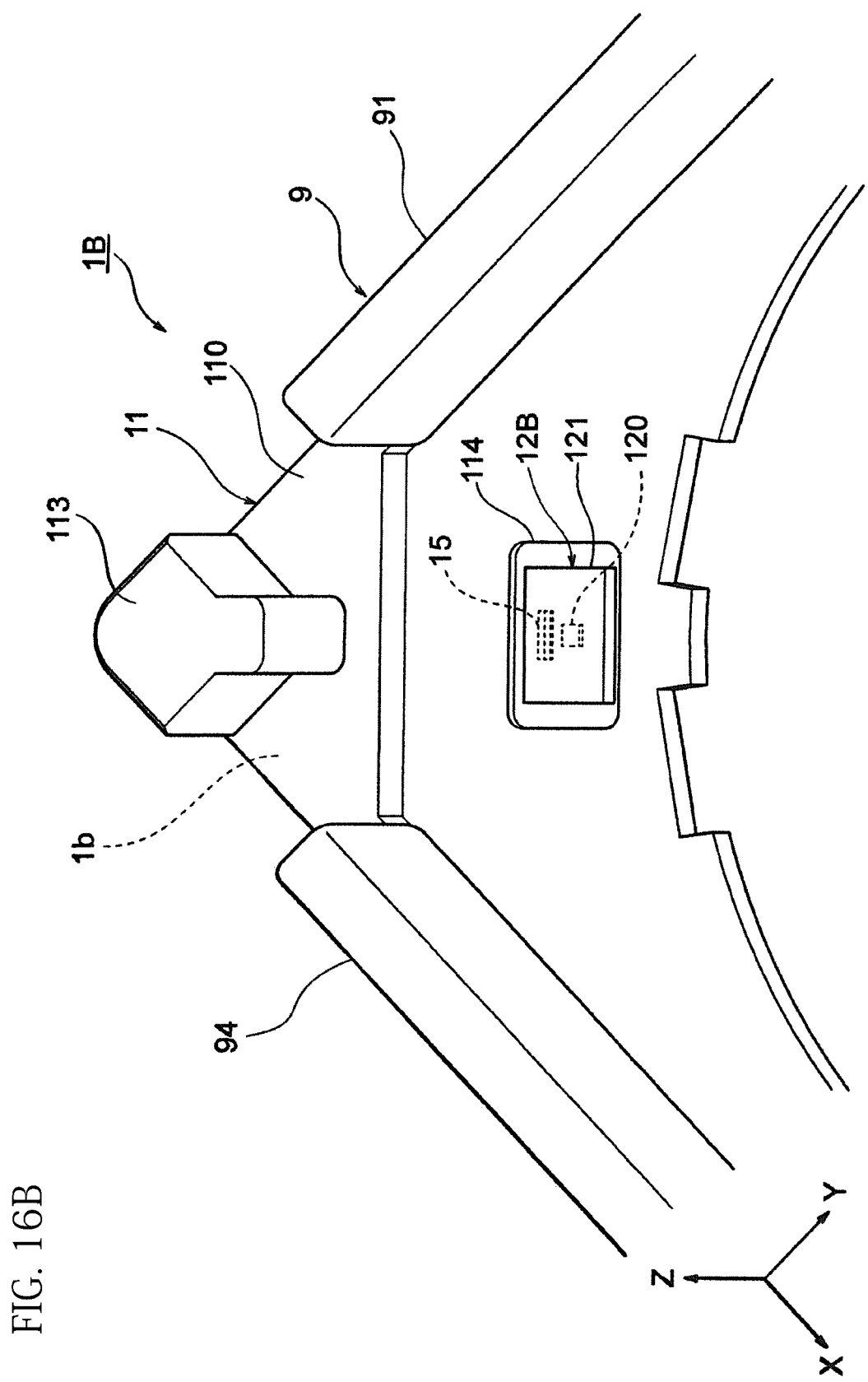
FIG. 16B is a partial schematic view of a modified example of a bias magnet shown in FIG. 16A.

In Third Embodiment, for example, the length of the bias magnet 15 in a direction perpendicular to a magnet-pole direction of the bias magnet 15 (a direction connecting the N pole and the S pole; the vertical direction of the paper of FIG. 16A) is smaller than that of the longer sides of the sensor 120 as shown in FIG. 16A, but may be larger than that of the longer sides of the sensor 120 as shown in FIG. 16B. In this case as well, effects similar to those of Third Embodiment can be obtained. In FIG. 16A and FIG. 16B, the bias magnet 15 is disposed to face the sensor 120, but the positions of the bias magnet 15 and the sensor 120 may be shifted from each other. This is also the case with FIG. 16C and FIG. 16D mentioned below.

Figure 16C:
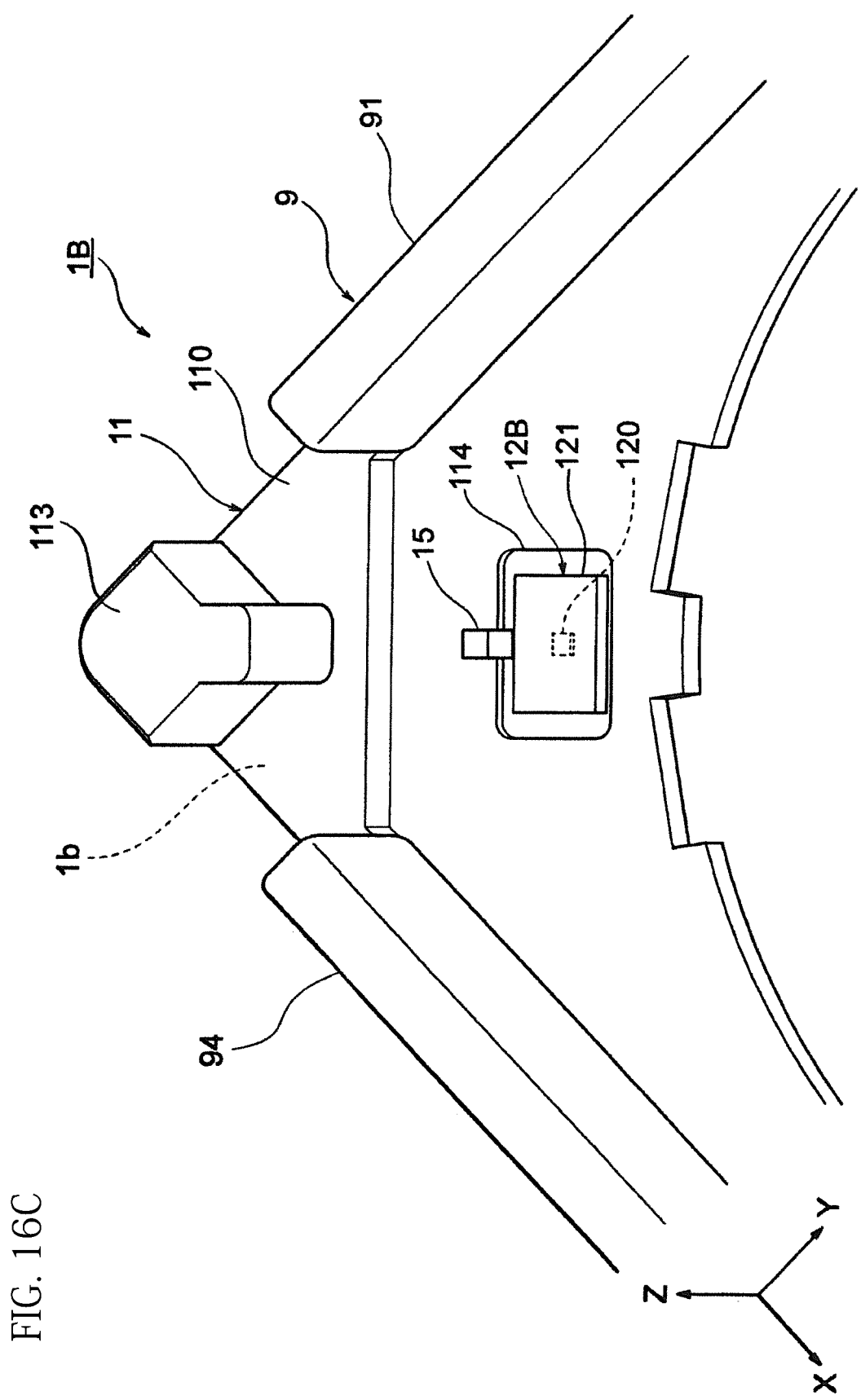
FIG. 16C is a partial schematic view of another modified example of a bias magnet shown in FIG. 16A.

In Third Embodiment, as shown in FIG. 16C, the bias magnet 15 may be disposed outside the sensor package 121. In the illustrated example, the bias magnet 15 is disposed next to the sensor package 121 at a position facing the sensor 120. The bias magnet 15 may be fixed to the base bottom 110 of the base 11 by a fixation member (e.g., adhesive) or may be embedded into the base bottom 110. Instead, the bias magnet 15 may be fixed on the back surface of the base bottom 110.

Figure 16D:
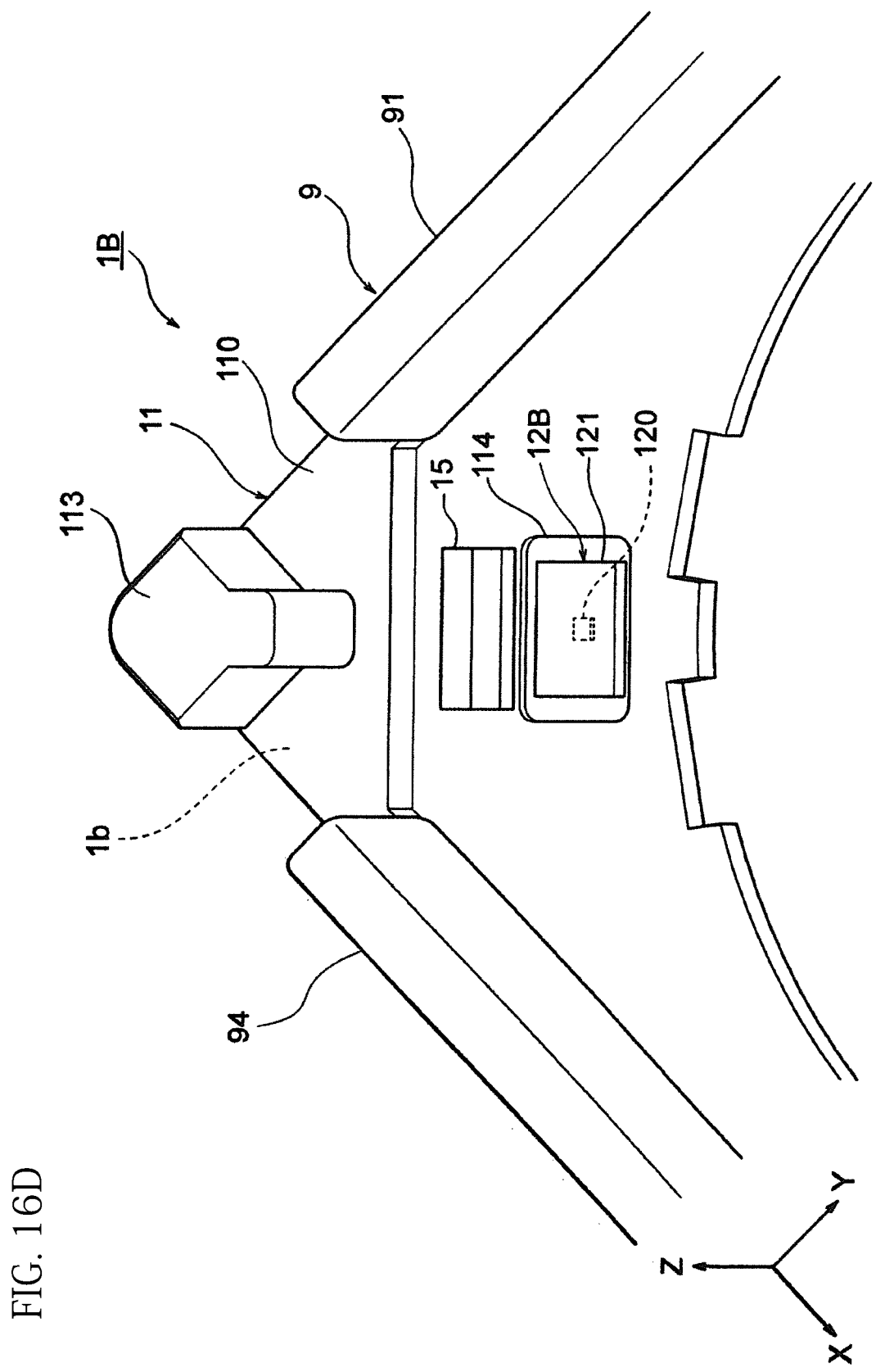
FIG. 16D is a schematic view of a modified example of the bias magnet shown in FIG. 16C.

A housing concave for housing the bias magnet 15 may be formed on the base bottom 110, and the bias magnet 15 may be placed in the housing concave and fixed by a fixation member. In this case, the housing concave may be formed jointly (continuously) to the sensor housing concave 114 or may be formed away from the sensor housing concave 114. Incidentally, the length of the bias magnet 15 in a direction perpendicular to the magnet-pole direction of the bias magnet 15 may be smaller than that of the longer sides of the sensor 120. Instead, as shown in FIG. 16D, the length of the bias magnet 15 in a direction perpendicular to the magnet-pole direction of the bias magnet 15 may be larger than that of the longer sides of the sensor 120 (or the length of the longer sides of the sensor package 121).

In the above-mentioned embodiments, the optical element drive device may be added with an autofocus function in addition to an image stabilization function.

The above-mentioned embodiments show an application example of the present invention to a moving-coil type optical element drive device, but the present invention may be applied to a moving-magnet type optical element drive device. In that case, instead of the drive coil 4, the movable section (e.g., lens holder 5) is provided with the drive magnet 9.

In the above-mentioned embodiments, the optical element drive device is provided with the lens (not illustrated), but may be provided with any other optical element other than lens, such as prism and liquid lens.

In the above-mentioned embodiments, the lens holder 5 is provided with the balance magnet 7, but instead of the balance magnet 7, the lens holder 5 may be provided with any other balance member having a predetermined weight (a weight member that functions as a weight).

DESCRIPTION OF THE REFERENCE NUMERICAL 1, 1A, 1B, 1C . . . optical element drive device
2 . . . yoke
20 . . . yoke front edge
21 . . . outer cylinder
22 . . . yoke opening
23 . . . protrusion piece
3 . . . front spring
30 . . . inner ring
31 . . . outer ring
32 . . . base fixation portion
33 . . . arm
34 . . . holder fixation portion
4, 4A, 4C . . . drive coil
41C . . . first coil
42C . . . second coil
5, 5A . . . lens holder
50 . . . holder front end
500 . . . spring fixation portion
51 . . . holder back end
510 . . . spring fixation convex
52 . . . cylinder
53 . . . protrusion-piece insertion groove
54 . . . front holder stopper
55 . . . back holder stopper
56 . . . sensor-magnet insertion groove
57 . . . balance-magnet insertion groove
58 . . . coil insertion groove
6 . . . sensor magnet
7 . . . balance magnet
8 . . . back spring
80 . . . ring
81 . . . holder fixation portion
82 . . . base fixation portion
83 . . . arm
9, 9C . . . drive magnet
91, 91C . . . first magnet
92, 92C . . . second magnet
93 . . . third magnet
94 . . . fourth magnet
10 . . . circuit unit
100 . . . wiring
110 . . . connector
11 . . . base member
110 . . . base bottom
111 . . . base opening
112 . . . base stopper
113 . . . column
114 . . . sensor housing concave
115 . . . spring fixation convex
12, 12B . . . sensor unit
120 . . . sensor
121 . . . sensor package
121a . . . front end
13 . . . fixation member
14 . . . dumper member
15 . . . bias magnet

What is claimed is:

1. An optical element drive device comprising:
    a movable section including a first magnetic field generator for generating a first magnetic field and being drivable in a motion direction; and
    a fixed section including a sensor unit,
    wherein the sensor unit carries out a detection based on the first magnetic field and a bias magnetic field different from the first magnetic field.

2. The optical element drive device according to claim 1, wherein the sensor unit detects a combined magnetic field of the first magnetic field and the bias magnetic field.

3. The optical element drive device according to claim 2, wherein
    the fixed section includes a bias magnetic field generator for generating the bias magnetic field, and
    the bias magnetic field generator is disposed around a sensor included in the sensor unit.

4. The optical element drive device according to claim 2, wherein
    the fixed section includes a second magnetic field generator for generating a second magnetic field, and
    the second magnetic field is applied to the sensor unit as the bias magnetic field.

5. The optical element drive device according to claim 4, wherein the sensor unit carries out a detection based on the first magnetic field and the second magnetic field.

6. The optical element drive device according to claim 2, wherein the sensor unit includes a sensor capable of detecting an angle corresponding to a movement displacement of the first magnetic field generator.

7. The optical element drive device according to claim 1, wherein
    the fixed section includes a bias magnetic field generator for generating the bias magnetic field, and
    the bias magnetic field generator is disposed around a sensor included in the sensor unit.

8. The optical element drive device according to claim 7, wherein
    the fixed section includes a second magnetic field generator for generating a second magnetic field, and
    the second magnetic field is applied to the sensor unit as the bias magnetic field.

9. The optical element drive device according to claim 7, wherein the sensor unit includes the sensor capable of detecting an angle corresponding to a movement displacement of the first magnetic field generator.

10. The optical element drive device according to claim 1, wherein
    the fixed section includes a second magnetic field generator for generating a second magnetic field, and
    the second magnetic field is applied to the sensor unit as the bias magnetic field.

11. The optical element drive device according to claim 10, wherein the sensor unit carries out a detection based on the first magnetic field and the second magnetic field.

12. The optical element drive device according to claim 11, wherein the sensor unit detects a combined magnetic field of the first magnetic field and the second magnetic field.

13. The optical element drive device according to claim 11, wherein the movable section includes a coil to be drivable by interaction of a magnetic field generated by the coil and the second magnetic field.

14. The optical element drive device according to claim 10, wherein the sensor unit detects a combined magnetic field of the first magnetic field and the second magnetic field.

15. The optical element drive device according to claim 14, wherein the movable section includes a coil to be drivable by interaction of a magnetic field generated by the coil and the second magnetic field.

16. The optical element drive device according to claim 10, wherein the movable section includes a coil to be drivable by interaction of a magnetic field generated by the coil and the second magnetic field.

17. The optical element drive device according to claim 16, wherein the sensor unit is disposed closer to a center of the fixed section than to the coil when viewed from the motion direction of the movable section.

18. The optical element drive device according to claim 10, wherein
the second magnetic field generator comprises a plurality of second magnetic field generators, and
the sensor unit is disposed within a region defined by the second magnetic field generators.

19. The optical element drive device according to claim 1, wherein the sensor unit includes a sensor capable of detecting an angle corresponding to a movement displacement of the first magnetic field generator.

20. The optical element drive device according to claim 1, wherein the movable section includes a balance member disposed on the other side of the first magnetic field generator across an optical element.

21. The optical element drive device according to claim 1, wherein
stoppers for regulating a movement of the movable section in the motion direction are arranged away from each other in the fixed section, and
the sensor unit is disposed within a region sandwiched by ends of the stoppers next to each other when viewed from the motion direction of the movable section.

22. The optical element drive device according to claim 1, wherein the sensor unit is disposed so as not to overlap with a back spring for supporting the movable section from behind when viewed from the motion direction of the movable section.

23. The optical element drive device according to claim 1, wherein the sensor unit is disposed so that a front end of the sensor unit is located forward from a front end of a stopper for regulating a movement of the movable section in the motion direction and is located backward from a back end of a back spring for supporting the movable section from behind.

24. The optical element drive device according to claim 1, wherein the sensor unit faces the first magnetic field generator via a fixation member for fixing the sensor unit to the fixed section.

25. The optical element drive device according to claim 1, wherein
the fixed section includes a yoke disposed to surround the movable section,
the yoke is provided with a pair of protrusion pieces protruding toward an inner side of the yoke, and
either of the protrusion pieces is located at an end of the yoke located on one side of the sensor unit, and the other protrusion piece is located at an end of the yoke located on the other side of the sensor unit, when viewed from a direction perpendicular to the motion direction of the movable section.

26. The optical element drive device according to claim 1, wherein the first magnetic field generator is embedded into the movable section.

27. An electronic equipment comprising the optical element drive device according to claim 1.

* * * * *